United States Patent
Viger et al.

(10) Patent No.: US 12,452,854 B2
(45) Date of Patent: Oct. 21, 2025

(54) METHODS AND APPARATUSES FOR OPTIMIZED MULTI-AP COORDINATION

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 17/928,254

(22) PCT Filed: May 28, 2021

(86) PCT No.: PCT/EP2021/064313
§ 371 (c)(1),
(2) Date: Nov. 28, 2022

(87) PCT Pub. No.: WO2021/239929
PCT Pub. Date: Dec. 2, 2021

(65) Prior Publication Data
US 2023/0209531 A1    Jun. 29, 2023

(30) Foreign Application Priority Data
May 29, 2020 (GB) .................................. 2008112

(51) Int. Cl.
*H04W 72/121*   (2023.01)
(52) U.S. Cl.
CPC ................................. *H04W 72/121* (2013.01)
(58) Field of Classification Search
CPC ................................................... H04W 72/121
See application file for complete search history.

(56) References Cited

U.S. PATENT DOCUMENTS

2005/0053037 A1    3/2005  Ginzburg et al.
2007/0127424 A1*   6/2007  Kwon ................... H04L 1/1614
                                                   370/338
(Continued)

FOREIGN PATENT DOCUMENTS

CN         1543731 A     11/2004
CN       107211452 A      9/2017
(Continued)

OTHER PUBLICATIONS

Uplink Coordinated Multi-AP; Doostnejad, Roya; Intel Corporation; IEEE Draft; Doc.: IEEE 802.11-19/1903r0; Nov. 2019; pp. 1-23. Retrieved from the Internet: URL: https://mentor.ieee.org/802.11/dcn/19/11-19-1903-00-00be-uplink-coordinated-multi-ap.pptx [retrieved on Nov. 9, 2019].

Kedem et al.; "Multi-AP Operation—Basic Definition"; Huawei; IEEE Draft; Doc.: IEEE 802.11-20-0617/r1; May 14, 2020; pp. 1-20. Retrieved from the Internet: URL: https://mentor.ieee.org/802.11/dcn/20/11-20-0617-01-00be-multi-ap-operation-basic-definition.pptx [retrieved on May 14, 2020].

(Continued)

*Primary Examiner* — Gbemileke J Onamuti
(74) *Attorney, Agent, or Firm* — Canon U.S.A., Inc. IP Division

(57) ABSTRACT

In a 802.11 be multi-AP collaboration, collaborated devices obtaining shared resources announced by a collaborator AP re-announce the shared resource for the stations out of the transmission range of the collaborator AP. Given the short time available, the re-announcing frame binary repeats most of the initial announcement by the collaborator AP, in particular substantially the whole MAC payload thereof. In order to facilitate the identification of the re-announcing, the latter comprises an empty TA field or no TA field in its header. This additionally allows any AP to act as the coordinator AP.

16 Claims, 10 Drawing Sheets

(56) References Cited

U.S. PATENT DOCUMENTS

| | | | |
|---|---|---|---|
| 2010/0046430 A1* | 2/2010 | Naito | H04L 47/34 |
| | | | 370/328 |
| 2012/0163349 A1 | 6/2012 | Fontaine et al. | |
| 2015/0063327 A1 | 3/2015 | Barriac et al. | |
| 2019/0373599 A1 | 12/2019 | Ghosh et al. | |
| 2020/0045555 A1 | 2/2020 | Huang | |
| 2020/0076552 A1 | 3/2020 | Cherian | |
| 2020/0252855 A1 | 8/2020 | Polacheck | |

FOREIGN PATENT DOCUMENTS

| | | |
|---|---|---|
| CN | 110602660 A | 12/2019 |
| GB | 2542818 A | 4/2017 |
| WO | 2016028131 A1 | 2/2016 |
| WO | 2019/066850 A1 | 4/2019 |

OTHER PUBLICATIONS

Ryu et al.; "Consideration on multi-AP coordination for EHT"; LG Electronics; IEEE Draft; Doc.: IEEE 802.11-18/1982r0; Nov. 13, 2018; pp. 1-9. Retrieved from the Internet: URL: https://mentor.ieee.org/802.11/dcn/18/11-18-1982-00-0eht-consideration-on-multi-ap-coordination-for-eht.pptx [retrieved on Nov. 13, 2018].

Park et al.; "Multi-AP Transmission Procedure"; LG Electronics; IEEE Draft; Doc.: IEEE 802.11-19/0048r0; Mar. 12, 2019; pp. 1-18. Retrieved from the Internet: URL: https://mentor.ieee.org/802.11/dcn/19/11-19-0448-00-0eht-multi-ap-transmission-procedure.pptx [retrieved on Mar. 12, 2019].

* cited by examiner

METHODS AND APPARATUSES FOR OPTIMIZED MULTI-AP COORDINATION

CROSS-REFERENCE TO RELATED APPLICATIONS

This application the National Phase application of PCT Application No. PCT/EP2021/064313, filed on May 28, 2021 and titled "METHODS AND APPARATUSES FOR OPTIMIZED MULTI-AP COORDINATION." This application claims the benefit under 35 U.S.C. § 119 (a)-(d) of United Kingdom Patent Application No. 2008112.1, filed on May 29, 2020 and entitled "METHODS AND APPARATUSES FOR OPTIMIZED MULTI-AP COORDINATION." The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include
Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) managing a Basic Service Set (BSS) to schedule MU transmissions, i.e. multiple simultaneous transmissions to or from non-AP stations of the BSS, in the wireless network. For example, one of such MU schemes has been adopted by the Institute of Electrical and Electronics Engineers (IEEE) in the 802.11ax standard, draft version 3.0 (D3.0) of June 2018.

Thanks to the MU feature, a non-AP station has the opportunity to gain access to the wireless medium via two access schemes: the MU scheme and the conventional Enhanced Distributed Channel Access—EDCA (Single User) scheme.

Each BSS defines a main elementary channel of the wireless medium (known as a primary channel, usually a 20 MHz channel or a multiple of 20 MHz channel) on which the stations (including the AP) perform EDCA contention. To increase bandwidth for the forthcoming transmission, the stations can simultaneously contend for additional 20 MHz channels, known as secondary channels. The communication channel thus granted for transmission comprises the primary channel and optionally secondary channels.

The 802.11ax standard allows a MU downlink (DL) transmission to be performed by the AP when gaining access to the wireless medium for a transmission opportunity (TXOP). During the MU DL transmission on the granted communication channel, the AP performs multiple simultaneous elementary transmissions, over so-called resource units (RUs), to various non-AP stations. As an example, the resource units split the communication channel of the wireless network in the frequency domain, based for instance on Orthogonal Frequency Division Multiple Access (OFDMA) technique. The assignment of the RUs to the non-AP stations is signaled at the beginning of the MU Downlink frame, by providing an association identifier (AID) of a non-AP station (individually obtained by each station during its association procedure with the AP) for each RU defined in the transmission opportunity.

The 802.11ax standard also allows a MU uplink (UL) transmission to be triggered by the AP when gaining access to the wireless medium. During the MU UL transmission, various non-AP stations can simultaneously transmit data to the AP over the resource units forming the communication channel. To control the MU UL transmission by the non-AP stations, the AP previously sends a control frame, known as a Trigger Frame (TF). The Trigger Frame allocates the resource units to the non-AP stations of the same BSS, using 16-bit Association IDentifiers (AIDs) assigned to them upon registration to the AP and/or using reserved AIDs designating a group of non-AP stations. The TF also defines the start of the MU UL transmission by the non-AP stations as well as the length thereof.

Recently, the IEEE 802.11 be draft standard Task Group addresses a so-called Multi-AP technology. The latter aims at providing some degree of collaboration among neighbouring access points (APs managing separate BSSs) in order to have a more efficient utilization of time, frequency and spatial resources available. This is particularly important when the neighbouring APs operate over the same selected communication channel (or channel sufficient close to communicate which each other).

With such a technology, two or more neighbouring APs may share resources in terms of frequency and/or time and, in this way, they prevent interferences.

The AP that initializes and manages the multi-AP collaboration by sharing resources of its granted TXOP is referred to as sharing or coordinator AP. It maintains an AP Candidate Set registering the candidate APs for participating in the collaboration, that have requested to be part of the set. Such APs that participate in the multi-AP collaboration and uses shared resources are referred to as shared or coordinated APs. Corresponding BSS is known as coordinated BSS.

The coordinator AP usually sends a sharing announcement frame that defines which resources are allocated to which coordinated APs. A trigger frame may be used. A coordinated AP can schedule MU downlink (DL) and/or uplink (UL) transmissions for its associated non-AP stations within the constraints (usually in terms of frequency and time) of its allocated resources. The multi-AP collaboration is preferably dynamic, meaning that different APs of the same multi-AP group may act as the coordinator AP to get the wireless medium and share resources.

With the multi-AP scheme, the resources shared with a coordinated AP may not include the primary channel of the coordinated BSS. For the coordinated AP to efficiently schedule MU DL or UL transmissions within the shared resources, it is needed that all the stations of the coordinated BSS temporarily switch from their native primary channel to another channel of the shared resources where the coordinated AP communicate to manage the MU transmissions, until the end of the shared TXOP. However, some non-AP stations of the shared BSS may be out of range of the coordinator AP and thus may not receive the sharing announcement frame. It turns that they will not be able to switch their primary channel to the correct channel and thus not be able to participate to any MU transmission initiated by their local AP (to which they registered) within the shared resources.

Contribution IEEE 802.11-20/0277r1 to the 802.11be standard discloses that the coordinated APs may have to indicate temporary channel switch to their associated non-AP stations to properly operate during the shared opportunity. These coordinator APs simultaneously transmit the same switching frame. The latter include only information essential for the non-AP stations of their BSS, such as the primary channel and the bandwidth of the shared resources, and must set the TA field of the MAC Header to the coordinator AP's MAC address.

A first issue with this scheme is the difficulty for the coordinated APs to locally build an identical switching frame, in particular if they rely on hardware built by different companies. Indeed, the coordinated APs have to organize the same essential information in the same order within the switching frame. However, the order of some information, such as the User Info fields (defining the RUs and the corresponding allocation to stations) is not imposed to the devices; it is only depends on the implementation of the AP.

A second issue with the known multi-AP scheme is the need for a coordinated AP to share a priori (e.g. during association) the MAC address of the coordinator AP with its associated non-AP stations. This is for these non-AP stations to efficiently decode the switching frame with TA equal to coordinator AP's MAC address. Consequently, the coordinator AP has to be known by all the stations, meaning the coordinator AP must be fixed.

It is desirable to design more efficient mechanisms to perform multi-AP operation with out-of-range stations.

SUMMARY OF INVENTION

It is a broad objective of the present invention to overcome some of the foregoing concerns.

In this context, the invention provides a communication method in a wireless network comprising, at a wireless device:

receiving, from a coordinator device being granted a transmission opportunity, TXOP, a frame announcing the sharing of resources of the granted TXOP, the announcing frame being made of a short starting portion and a large data portion; and responsive to the receiving of the announcing frame, sending a re-announcing frame repeating the large data portion of the received announcing frame.

This resource sharing can be made to the benefit of any wireless device outside the BSS of the coordinator device, for instance other APs.

The wireless device involved in the method, i.e. a coordinated device managing a group of wireless devices (e.g. a BSS or a DirectLink group), builds the re-announcing frame by binary replicating or copying the same large data portion as the one of the receiving announcing frame. It turns that the operations of building the re-announcing frame are merely simple and not subject to implementations varying from one device to the other. This is important because the coordinated devices may have very few time (such as a SIFS) to generate the re-announcing frame, which happens for instance when the coordinated device is allocated the shared resource declared at the very end of the announcing frame. Various coordinated devices involved in the multi-AP scheme can therefore build strictly identical re-announcing frames in a very short time, before simultaneous transmitting them.

Furthermore, by repeating the large data portion, the coordinated devices allow the out-of-range devices (from the coordinator device point of view, e.g. an Access Point, AP) to eventually be aware of the multi-AP resource sharing. Consequently, they are able to temporarily switch their primary channel, if required.

The invention also provides a communication method in a wireless network comprising, at a coordinator device:

sending a frame to be granted a transmission opportunity, TXOP, the frame further announcing the sharing of resources of the granted TXOP and comprising a re-announcing field indicating whether at least one coordinated device concerned with the resource sharing has to re-announce the resource sharing, the announcing frame including a short starting portion and a large data portion; and receiving, from the coordinated device or devices, a re-announcing frame repeating the large data portion of the sent announcing frame.

Consequently, the coordinator device efficiently drives the re-announcing of the resource sharing, for instance when it is aware that some devices concerned by the resource sharing (i.e. devices being allocated shared resources) are liable to be out-of-range of the initial announcing frame.

Furthermore, by receiving the re-announcing frames from the coordinated devices, the coordinator device has confirmation that the coordinated devices are working in an appropriate way.

Correlatively, the invention also provides a wireless communication device comprising at least one microprocessor configured for carrying out the steps of any of the above methods.

Optional features of embodiments of the invention are defined in the appended claims. Some of these features are explained here below with reference to a method, while they can be transposed into device features.

In some embodiments, the large data portion is a MAC payload of the announcing frame. In that case, the whole MAC payload is kept as it is (binary copy), the re-announcing frame having only a different (short) MAC header to be generated. This is the shortest and safest way to generate the re-announcing frame.

In other embodiments, the re-announcing frame has a MAC header and one or more starting fields in a MAC payload that are different from the announcing frame. The remainder of the MAC payload is kept as it is. This allows the coordinated devices to add signaling if needed.

In some embodiments concerning a coordinated device, sending the re-announcing frame is further responsive to determining, from the received announcing frame, that the shared resources allocated to the wireless device do not encompass a primary channel of the wireless device. In other words, the coordinated device resends the large data portion or the MAC payload only if it has to switch its primary channel.

In some embodiments, sending the re-announcing frame is further responsive to determining that a re-announcing field of the received announcing frame indicates the wireless device has to re-announce the resource sharing. In that way, the coordinator device can efficiently drive when a re-announcing is required, possibly on a per-coordinated-device basis.

According to a particular feature, the re-announcing field indicates that wireless devices having to switch their primary channel have to re-announce the resource sharing.

In some embodiments, the wireless device is a managing device managing a group of wireless devices, such as an AP managing a BSS or a group owner managing a peer-to-peer, P2P, group implementing DirectLink transmissions.

In some embodiments, the re-announcing frame comprises an empty transmitter address, TA, field or no TA field in its MAC header. For instance, the re-announcing frame may be a mere duplicate of the received announcing frame, wherein the transmitter address, TA, field of the MAC header is emptied.

This approach advantageously avoids having a fixed coordinator device that must be known by each and every station. On the contrary, the empty TA field allows any AP to dynamically operate as coordinator of the multi-AP sharing (contrary to known technics where the coordinator AP's MAC address is signaled in the TA field).

Furthermore, the empty TA field is a clear indication for the wireless devices that the frame is a re-announcing frame. They can act accordingly (for instance analyzing the MAC payload to determine whether a primary channel switch is required, or starting MU UL or DL transmissions after a SIFS).

In some embodiments, the wireless device is an Access Point, AP, that further sends a trigger frame over shared resources allocated to the AP to trigger a multi-user uplink transmission over the allocated shared resources with non-AP stations of its own basic service set.

In some embodiments, the wireless device is an Access Point, AP, that further starts a multi-user downlink transmission over allocated shared resources with non-AP stations of its own basic service set. For instance, the multi-user downlink transmission may include an indication of a subsequent multi-user uplink transmission opportunity over the allocated shared resources.

In some embodiments, the wireless device further sends a frame announcing the sharing of part of the shared resources allocated to the wireless device. This sub-sharing of the resources can be made to the benefit of other wireless devices outside its own BSS, for instance other APs such as APs out of the transmission range of the coordinator device.

In some embodiments concerning the coordinator device, the re-announcing field indicates that coordinated devices having to switch their primary channel have to re-announce the resource sharing.

In some embodiments, the re-announcing field is provided at shared resource (e.g. RU) level (e.g. at User Info field level in a Trigger Frame). This aims for the coordinator device to selectively choose which coordinated device has to send the re-announcing frame.

In other embodiments, the coordinator device further sends the re-announcing frame simultaneously to the coordinated device or devices.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS

Figure 1:
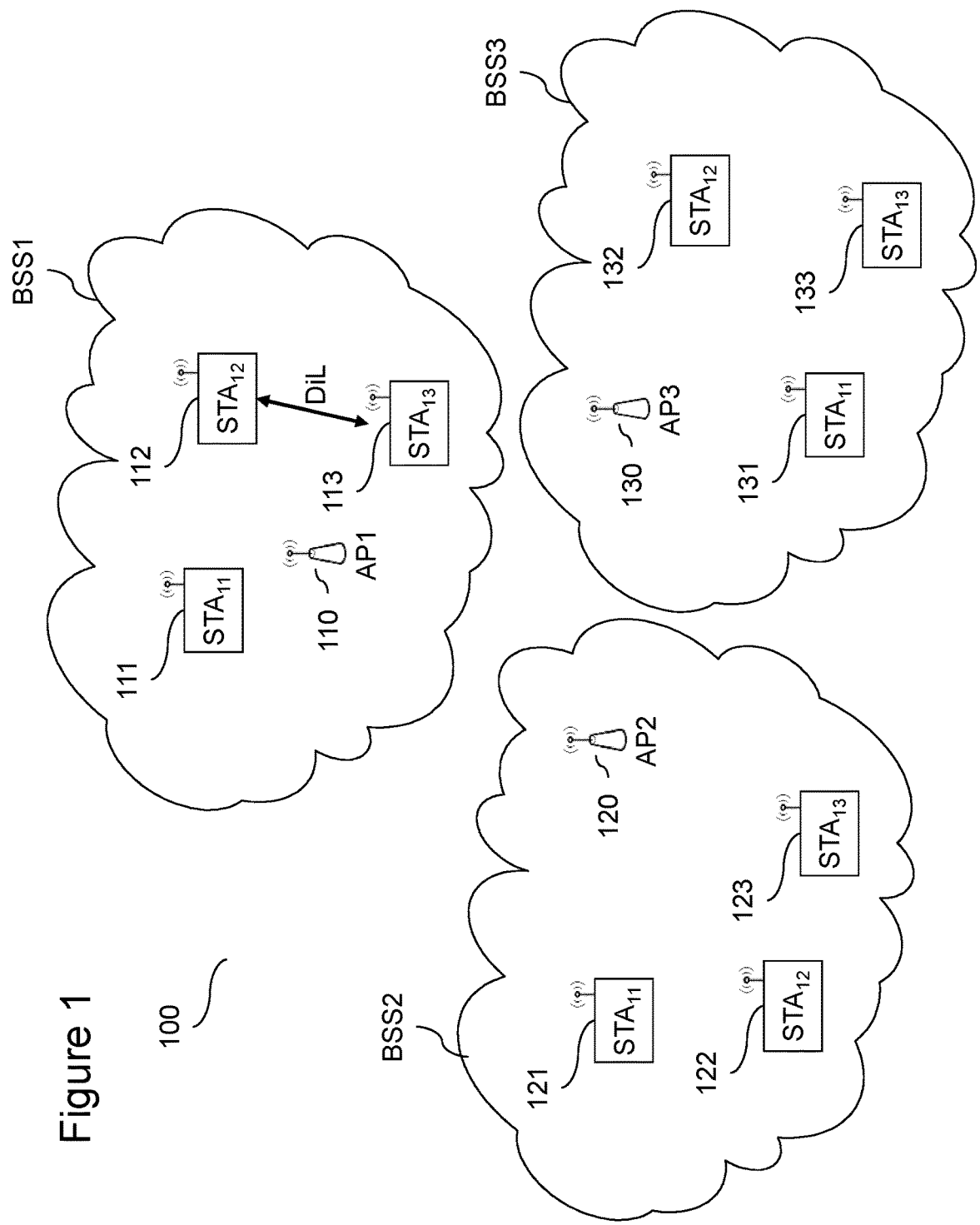
FIG. 1 illustrates an exemplary network environment in which embodiments of the present disclosure may be implemented.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates an exemplary network environment in which embodiments of the present disclosure may be implemented.

The illustrated wireless network environment comprises a multiple AP system 100 formed by a group of neighbouring wireless networks that operate over a common communication channel or wireless medium. The common communication channel may correspond to a part (e.g. 20 MHz) or all of an operating channel (e.g. 20 MHz, 40 MHz, 80 MHz or 160 MHz).

A first wireless network BSS1 comprises an access point (AP) 110 and three non-AP stations (STAs) 111, 112 and 113 associated with the AP 110 (i.e. registered with it). A second wireless network BSS2 comprises an AP 120 and three associated non-AP STAs 121, 122 and 123. A third wireless network BSS2 comprises an AP 130 and three associated non-AP STAs 131, 132 and 133. In the following, BSSx represents any of the wireless networks, while 1x1, 1x2 and 1x3 any of the non-AP stations. Of course, another number of wireless networks and any number of non-AP stations per wireless network can be contemplated. In the present disclosure, APs 110, 120 and 130 are also referred to, respectively, as AP1, AP2 and AP3. A device may act as an AP of one wireless network and at the same time may belong to another wireless network as an associated STA.

The stations (AP and non-AP) of each wireless network exchange data frames over the communication channel 100, under the management of the AP. A primary channel, usually 20 MHz channel, is defined per wireless network on which the management frames are exchanged. The other 20 MHz channels of the communication channel, if any, are known as secondary channels.

Also, direct communications (also known as direct link, DiL) between non-AP STAs can be implemented without the use of the access point (known as an Ad-hoc mode). For instance, WiFi-Direct standard allows devices to communicate directly over the 802.11 wireless medium without the need for any AP. Exemplary situation of direct communications, corresponding to an increasing trend nowadays, is the presence of peer-to-peer (P2P) transmissions between non-AP stations having the same primary channel, e.g. STA 112 and STA 113 illustrated in the Figure. Technologies that support P2P transmissions between non-AP STAs not associated with the same BSS or no BSS include for example WiFi-Miracast (RTM) and Wireless Display scenario, in addition to WiFi-Direct. Other technologies that support P2P transmissions within a BSS include Direct Link Setup (DLS) and Tunneled Direct Link Setup (TDLS). Even if P2P flows are usually not numerous, the amount of data per flow tends to be important, typically low-compressed video, from 1080p60 up to 8K UHD resolutions.

Each non-AP STA 1x1-1x3 registers to the AP 1x0 of one wireless network BSSx during an association procedure. During the association procedure over the primary channel, the AP assigns a specific Association IDentifier (AID) to the requesting station. For example, the AID is a 16-bit value uniquely identifying the station.

The stations (including the AP) compete one against another over the communication channel (including the primary channel and optionally secondary channels to increase bandwidth) using EDCA (Enhanced Distributed Channel Access) contention to access the communication channel in order to be granted a transmission opportunity (TXOP). The TXOP may then be used to transmit (single-user, SU) data frames or to implement multi-user (MU) transmissions. In the MU scheme, a single station, usually the AP of the wireless network BSSx, is allowed to schedule a MU transmission, i.e. multiple simultaneous transmissions to or from other stations of the wireless network. One implementation of such a MU scheme has been for example adopted in IEEE 802.11ax amendment standard, known as the Multi-User Uplink and Downlink OFDMA (MU UL and DL OFDMA) procedures. In the MU scheme, resources are defined over the 20 MHz channel or channels used, known as resource units.

More generally, the resources may include space, frequency and time resources and may be obtained according to different multiplexing schemes. Examples of those schemes include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system.

In the IEEE 802.11 wireless local area networking standards, the multiple AP system 100 may correspond to an extended service set (ESS) and each of the wireless networks to a basic service set (BSS).

Although the description of embodiments of the invention is given in the context of IEEE 802.11, the embodiments are not limited thereto and they may apply to other types of wireless networks and protocols.

Figure 2:
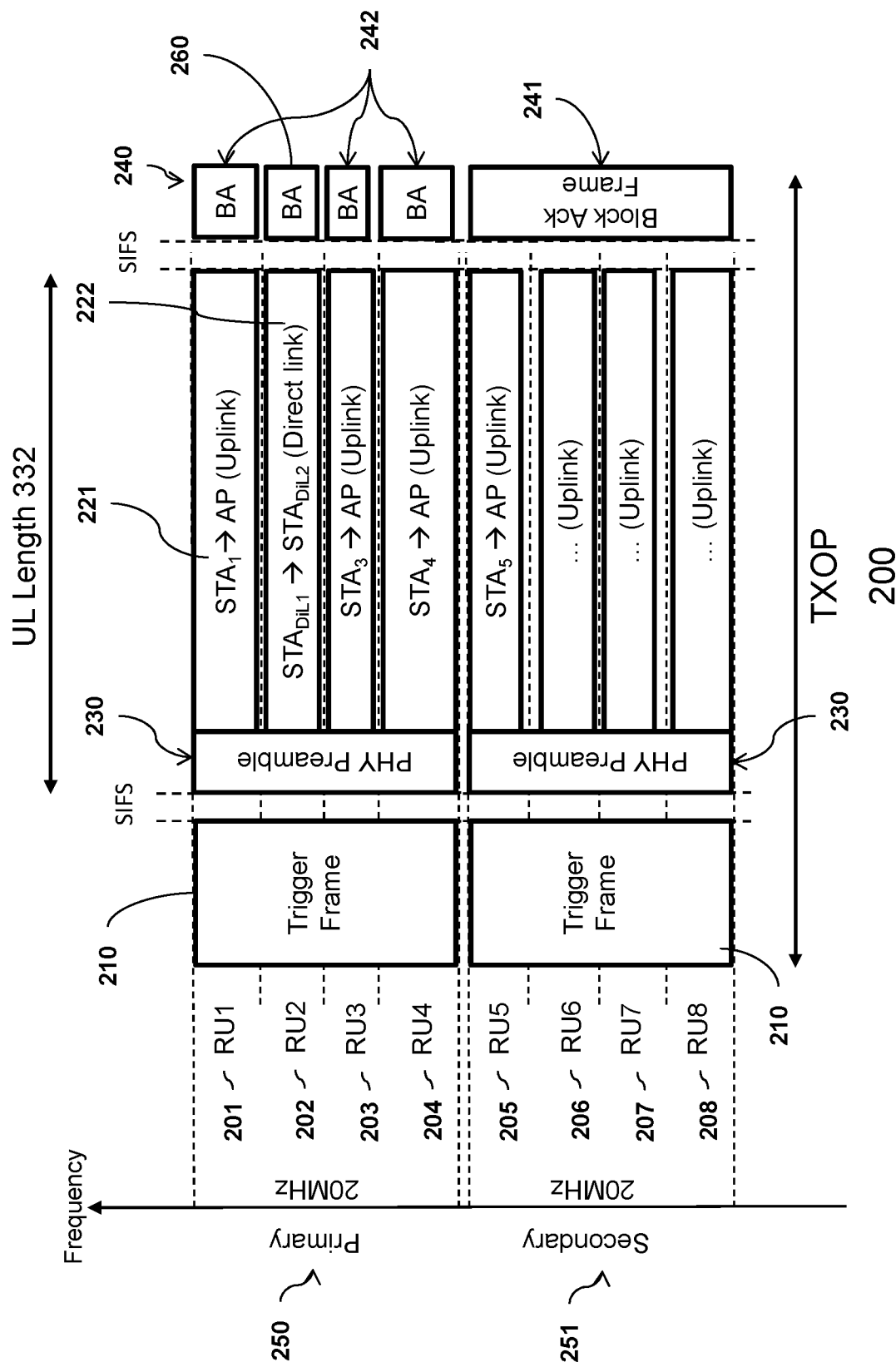
FIG. 2 illustrates a trigger-based (TB) Multi-User (MU) transmission.

FIG. 2 illustrates the MU scheme in any of the wireless networks BSSx, and more particularly a trigger-based (TB) Multi-User (MU) transmission that includes, in addition to MU uplink (UL) transmissions to the AP of BSSx, a MU transmission between non-AP STAs, i.e. a direct link (DiL) transmission.

The illustrated MU transmission is triggered by a trigger frame (TF) 210 reserving the communication channel for a transmission opportunity TXOP 200. The TF is a control frame, for instance in the IEEE 802.11 legacy non-HT format. The TF is sent by the APx over the primary 20 MHz channel 250 when detected as idle and duplicated (replicated) on one or more other (secondary) idle 20 MHz channel 251, if any, forming the communication channel. Due to the duplication of the control frame 210, it is expected that every nearby legacy station (non-HT or 802.11ac stations) receiving the TF on its primary channel (which may be a secondary channel for the BSSx considered), sets its NAV to the value specified in the header of the TF. This prevents these legacy stations from accessing the channels of the reserved communication channel during the transmission opportunity (TXOP).

Figure 3:
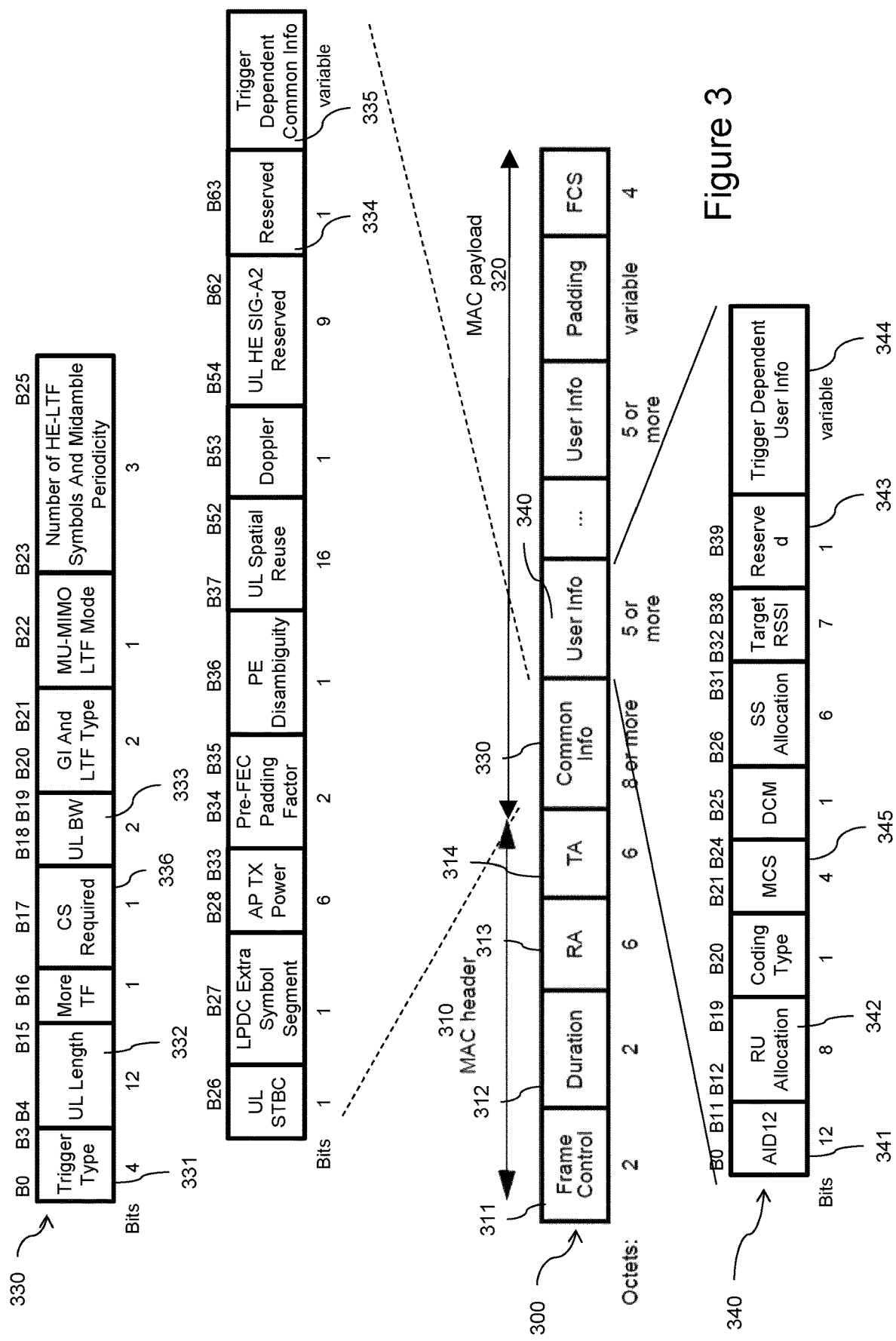
FIG. 3 illustrates the structure of a Trigger Frame.

The TF 210 has the structure shown in FIG. 3. It is a MAC (standing for Medium Access Control) frame 300 made of:

a MAC header 310 with a standardized "Frame Control" field 311, a standardized "Duration" field 312 defining the duration of the transmission opportunity (e.g. TXOP 200), an "RA" field set to a broadcast MAC address for the BSSx 313, and a "TA" field set to a MAC address of the AP transmitting the trigger frame 314, and a MAC payload 320.

The MAC payload 320 includes:
a "Common Info" field 330,
one or more "User Info" fields 340, and
padding and FCS fields.

The "Common Info" field 330 comprises a "Trigger Type" subfield 331 which specifies the type of the trigger frame. For the time being, eight values (0 to 7) are defined. For instance, a basic TF is signaled by a value 0 in the "Trigger Type" subfield 331.

The "Common Info" field 330 also comprises a "UL Length" field 332 specifying the duration of the solicited UL transmission (preamble 230 plus UL data 221), and a 2-bit "UL BW" field 333 specifying the bandwidth of the communication channel considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth. It ends by a reserved B63 bit 334 and a Trigger Dependent Common Info subfield 335 of variable length, the content of which depends on the "Trigger Type" subfield 320.

As shown in FIG. 2, elementary communication channels, here resources units RUs, are defined across the communication channel used. Basically, each resource unit is allocated to a different non-AP station in the MU scheme.

A resource unit RU1 201 to RU8 208 (more generally RUx) is formed by a group of sub-carriers, preferably adjacent, encompassed by the communication channel. This means that the frequency bandwidth of the communication channel is greater than or equal to that of the resource unit. The RUs may be allocated for scheduled access (the AP decides which non-AP station uses the RU) or random access (non-AP stations contend for access to the RU).

The RUs are defined by the AP in the TF 210. Back to FIG. 3, each "User Info" field 340 corresponds to one of the RUs. Any order of the "User Info" fields 340 can be used within the TF 300 because these fields are self-sufficient to define the RUs and their access schemes.

A "User Info" field 340 includes an "AID12" subfield 341, an "RU Allocation" subfield 342 and ends by a reserved B39 bit 343 and a "Trigger Dependent User Info" subfield 344 of variable length, the content of which depends on the "Trigger Type" subfield 320. Other fields exist that are not explained herewith for concision.

The "AID12" subfield 341 is set to the AID of the non-AP station to which the RU defined in "RU Allocation" subfield 342 is allocated in case of scheduled access or is set to AID=0 or 2045 to offer the corresponding RU to random access to respectively associated and unassociated non-AP stations. The 802.11ax standard (Table 9-31g of version D4.1 of the standard for instance) defines the values to be used in "RU Allocation" subfield 342 to designate a specific RU within the communication channel signaled in "UL BW" field 333.

In the example of FIG. 2, the TF 210 offers RUs to the non-AP stations (RU1 201 and RU3-RU8 203-208) for Uplink (UL) transmissions 221 and also offers a DiL transmission capability 222 within the triggered MU transmission by allocating a resource unit (here RU2 202) to this purpose. Previously, a manager or responsible or "group owner" of a P2P group may have advised the AP that the P2P group is willing to have new opportunity to DiL transmissions.

DiL transmission offered by the AP may be signaled in the associated "User Info" field 340 (i.e. the field corresponding to the offered RU) by using an appropriate value in the "AID12" subfield 341.

In one implementation, the "AID12" subfield 341 may convey a DiL session identifier corresponding to the direct link session (that the source and destination stations involved in the direct link communication can directly identify). This can be envisaged when the AP has allowed the P2P session (like for DLS protocol if within its BSS) or alternatively is aware of P2P protocol (outside its BSS and discovered through beacon frames or discovery frames of the coordinated scheme) and has granted an identifier to the session. Preferably, the DiL session identifier is constrained to the AID format of 12 bits; it is then up to the AP to allocate values distinct from those assigned to AIDs identifying individual non-AP stations.

Alternatively, the "AID12" subfield 341 may convey an AID of a non-AP station of the P2P group, for instance the group owner of the P2P group. Alternatively, as the AID may not be known by the non-AP 802.11ax station of the P2P group, a MAC address may be used instead of a station identifier (AID), because this kind of address is universally known and more especially shared with the AP and the stations. In variants, the two AIDs (if any) or the two MAC addresses of the non-AP stations involved in the DiL session can be indicated in the User Info field (using for instance the AID12 subfield 341 and/or the Trigger Dependent User Info section 344).

Back to FIG. 2, as a consequence of receiving the TF 210, the non-AP stations start the MU transmission (for UL or DiL transmission) a SIFS after the TF. They start sending their data frames in the High-Efficiency (HE) format introduced in 802.11ax.

High-Efficiency (HE) frames have been introduced in 802.11ax. As shown in FIGS. 4, these frames start with the same preamble 230 (L-STF, L-LTF and L-SIG) readable by any station (for backward compatibility), and continue with a complementary preamble and a Data field. The HE fields of the preamble can only be decoded by 802.11ax (and forward compatible) devices and are included in various types of HE frames, for example, HE single user (SU) PPDUs used for single user transmissions, HE MU (Multi-User) PPDUs used for transmissions to one or more stations, in particular for MU downlink (DL) transmissions from the AP to non-AP stations, and HE trigger-based (TB) PPDUs (HE_Trig) used for uplink (UL) transmissions from non-AP stations to the AP, in response to a trigger frame.

Figure 4A:
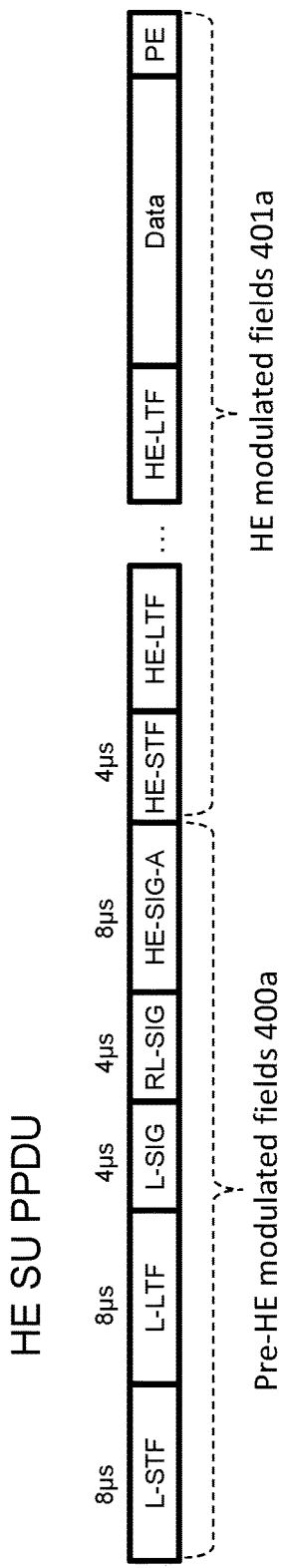
FIG. 4a illustrates the format of a HE SU PPDU.
Figure 4B:
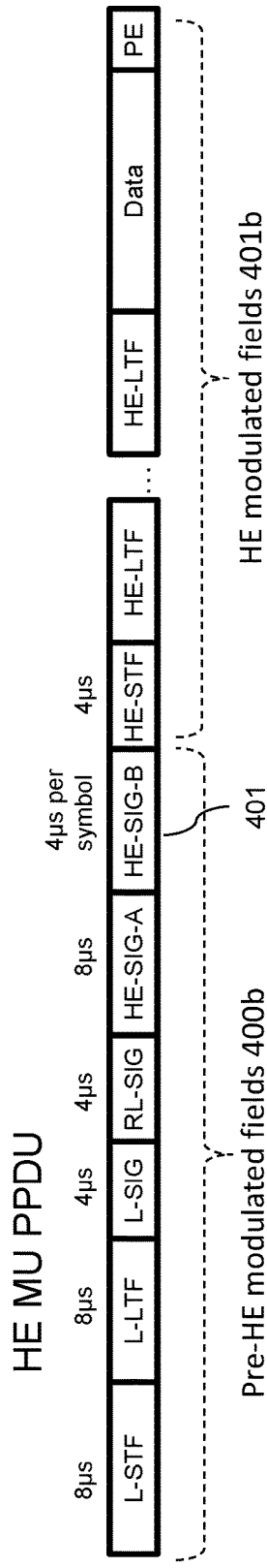
FIG. 4b illustrates the format of a HE MU PPDU.
Figure 4C:
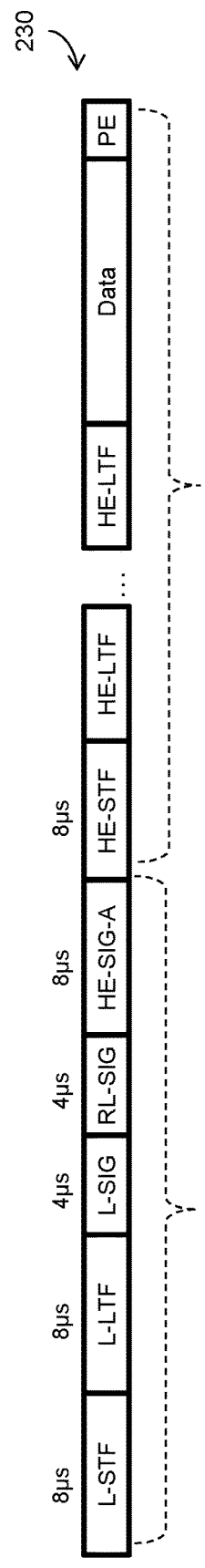
FIG. 4c illustrates the format of a HE TB PPDU.

FIGS. 4a, 4b and 4c illustrate the format of these various frames, respectively, HE SU PPDU, HE MU PPDU and HE TB PPDU frames. These HE frames as used as examples when describing embodiments of the invention. However, other formats can of course be contemplated. For example, Extremely-High-Throughput (EHT) frames introduced in 802.11be may well be used too.

FIG. 4a illustrates the format of a HE SU PPDU. It includes a legacy preamble (L-STF, L-LTF, L-SIG with RL-SIG), an HE preamble made of HE-SIG-A (HE SIGNAL A), HE-STF (HE Short Training Field) and HE-LTF (HE Long Training Field), and ends with the Data and PE (Packet Extension) fields. Legacy preamble and HE-SIG-A (referenced together as fields 400a) are duplicated on each 20 MHz channel used in the communication channel. The HE-SIG-A field includes multiple subfields indicating at set of transmission parameters of the PPDU, such as bandwidth (BW), a modulation and coding scheme (MCS), a number of data streams, a coding type, etc. The next fields 401a are modulated over the channel bandwidth.

FIG. 4b illustrates the format of a HE MU PPDU. It includes the same fields as HE SU PPDU (FIG. 4a), with an additional field 401, namely HE-SIG-B (HE SIGNAL B), used to tell the non-AP stations in which resource unit they will find their data (i.e. the allocations of the RUs to the non-AP stations). This is because the DL transmission directly starts without a previous triggering frame announcing the allocation of the RUs. HE-SIG-B 401 thus defines how the RUs forming the DL MU transmission are assigned to the non-AP stations, for the latter to efficiently receive their own data from the AP. Again, fields 400b are duplicated on each 20 MHz channel, while for fields 401b, HE-STF and HE-LTF are modulated over the channel bandwidth whereas the Data are modulated on the RU concerned only.

FIG. 4c illustrates the format of a HE TB PPDU (HE-Trig). This is the format used for data frames (preamble 230 and data 221) of FIG. 2. Each HE-Trig PPDU carries a single transmission (i.e. from one non-AP station) in response to the trigger frame. The HE-Trig frame has a format quite similar to the one of HE SU PPDU, except the duration of the HE-STF field is 8 μs. In particular, it does not include an HE-SIG-B field because the RU allocation to non-AP stations has already been defined by the TF 210. Again, fields 400c are duplicated on each 20 MHz channel, while for fields 401c, HE-STF and HE-LTF are modulated over the channel bandwidth whereas the Data are modulated on the RU concerned only.

DiL transmissions are based on the HE SU PPDU format if the DiL takes place on an entire 20 MHz channel or a multiple thereof, or on the HE TB PPDU format for the case where the transmission takes place on a subpart of a 20 MHz channel.

Conventional MU transmission imposes that preamble 230 is the same for all transmissions. More precisely, for 802.11ax, the pre-HE modulated fields 400c (composing the preambles 230) must be exactly the same and are simultaneously emitted on each 20 MHz band of the communication channel used. This includes the preamble of the DiL transmission made by a non-AP station to a destination DiL non-AP station.

Once the stations have used the scheduled and/or random RUs to transmit data to the AP, the AP responds with a Multi-User acknowledgment to acknowledge the data received on each RU. Acknowledgment frame 240 can follow the NON_HT PPDU format (241) to perform a block acknowledgment or the HE MU PPDU format (242) when sent on an OFDMA RU to perform an RU-based acknowledgment.

For the DiL transmission, it may be envisioned that the destination DiL non-AP station emits an acknowledgment frame 260 over the same RU as the one used for the DiL transmission 222. Acknowledgment frame 260 can follow the SU format (FIG. 4a).

Multi-AP technology has emerged where the APs 110, 120, 130 collaborate to share the common communication channel once one of them is granted access to it. The APs exchange messages one with each other to coordinate multi-AP communications, i.e. to avoid interference.

Multi-AP sharing of the common communication channel is resource-based. An amount of a shared resource can be measured in time units, frequency band width, number of streams, amount of data or traffic (e.g. number of bytes) and/or any other suitable unit, depending on the type of resources as defined above. For instance, frequency-organized RUs as shown in FIG. 2 can be shared, meaning that a first AP may offer one or more RUs to other APs. In this perspective, "shared resources", "shared frequency band", "shared channels" and "shared resource units" are synonyms and designate those resources offered by the coordinator AP to another AP through the multi-AP technology.

To coordinate the multi-AP communications, the APs may be part of an inter-AP coordination group, the formation of which is out of scope of the present invention. As an example, the APs willing to collaborate may previously issue management frames, like beacons or dedicated broadcasted frames, to advertise the other APs of their multi-AP coordination capability. The coordination group is also referred to as the AP Candidate Set for the multi-AP sharing.

Figure 5:
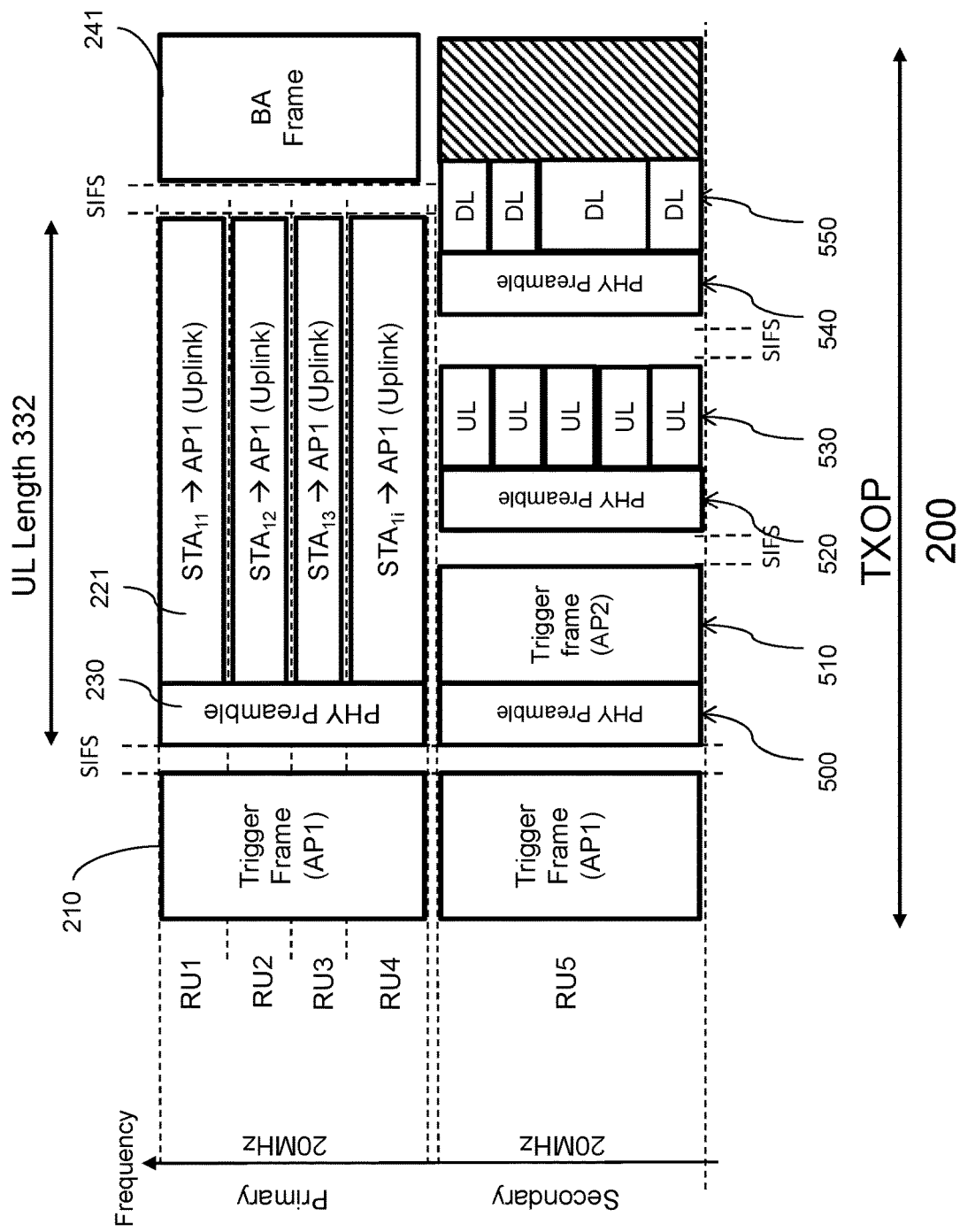
FIG. 5 illustrates a transmission sequence implementing the multi-AP technology to achieve coordinated OFDMA resource sharing.

FIG. 5 illustrates a transmission sequence implementing the multi-AP technology to achieve coordinated OFDMA resource sharing. It is based on 802.11ax frames. However, it may use equivalent frames.

The trigger frame 210 has a non-HT duplicate format, and is replicated on each 20 MHz channel forming the common communication channel (e.g. 40 MHz for the sake of illustration).

The trigger frame 210 sent from a coordinator or "sharing" AP (AP1 for the sake of illustration) is configured to trigger an MU transmission for another wireless network (BSS2 managed by AP2 for the sake of illustration), i.e. to initiate a multi-AP coordination to share part of its TXOP with other BSSs. To this end, the trigger frame 210 allocate one or more resource units of the reserved communication channel (here a single resource unit, RU5, having a 20 MHz width) to the other wireless network. In this perspective, the trigger frame 210 acts as a frame announcing the sharing of resources of the granted TXOP.

In the exemplary sequence shown, the TF 210 sent by AP1 allocates the resources units of its primary 20 MHz channel to non-AP STAs ($STA_{11}$, $STA_{12}$, $STA_{13}$, $STA_{1i}$) of its own wireless network (i.e. of BSS1). Conventional MU UL transmissions 221 therefore take place on the primary 20 MHz channel of the BSS: each of non-AP STAs ($STA_{11}$, $STA_{12}$, $STA_{13}$, $STA_{1i}$) emits an UL frame according to the HE TB PPDU format (FIG. 4c), where all pre-HE modulated fields 400c (forming the preamble 230) are emitted by these stations over the primary 20 MHz channel only.

In addition to conventional MU UL RUs, one or more resource units of the MU transmission are allocated to another wireless network (BSS2 in the example) managed by another AP (AP2). From coordinator AP's perspective, the other AP (AP2) is considered as a mere device, e.g. a station unassociated with the coordinator AP (AP1), i.e. usually without an AID assigned to it by the coordinator AP. The other AP is referenced coordinated or "shared" AP and will manage the shared resource allocated, by the coordinator AP, to its BSS.

The allocation of the resource units to coordinated AP (AP2) is signaled, by AP1, in the TF 210. As no AID known by AP1 exists for AP2, a dedicated identifier may be used to fill in the "AID12" subfield 341 of the corresponding "User Info" fields 340. For instance, the MAC address of the coordinated AP or the BSSID of the coordinated BSS may be used to signal that the resource unit is allocated to the coordinated AP/BSS (AP2/BSS2).

Such allocated resource units each occupies a frequency band made of a multiple of 20 MHz channels (e.g. 20, 40, 60, 80 MHz and so on). In other words, multi-AP technology preferably subleases 20 MHz channels. The shared frequency band may be continuous or punctured, and may be adjacent to the primary channel of BSS1 or not.

As mentioned previously, each wireless network BSSx defines its own primary 20 MHz channel on which contention is performed by the stations of this network. The shared frequency band may or not include the primary 20 MHz channel of coordinated BSS (here BSS2). When the shared frequency band does not include the primary 20 MHz channel of BSS2, AP2 and the non-AP stations of BSS2 have to temporarily switch their primary 20 MHz channel (until the end of the resource sharing) in order to efficiently communicate together on this shared band.

The "new" (and temporary) primary 20 MHz channel for the coordinated BSS (BSS2) may be defined by the coordinator AP (AP1) in the TF 210 (using appropriate flag) or be defined by rules known by all stations of the coordinated BSS.

The coordinated AP (AP2) uses the resource units of the MU transmission allocated to its BSS (RU5 in the example) to manage data exchange within its BSS (BSS2), in particular between non-AP stations of BSS2 and AP2.

Recursively, AP2 may sublease one or more 20 MHz channels of the shared resource units so obtained, to a station outside BSS2, for instance to another AP such as AP3. In that case, AP2 becomes a coordinator AP for AP3. As an example, when the coordinated device (AP2) is a transmitted BSSID AP of a physical AP, it may further allocate some of the shared frequency band to its non-transmitted BSSIDs.

When managing data exchange within the shared resources of the coordinated transmission, the coordinated device can transmit data frames using a single-user (SU) format because the shared frequency band is made of one or more entire 20 MHz channels, but may also transmit data frames using a multi-user (MU) format or mix both. The SU format used may be the HE SU PPDU format in accordance with IEEE 802.11ax standard (FIG. 4a); the MU format used may be the HE MU PPDU format in accordance with IEEE 802.11ax standard (FIG. 4b) (alternatively, an EHT MU PPDU format could be envisaged according to IEEE 802.11be standard). In the MU format case, the frame (preamble) has an HE-SIG-B field that contains additional information (such as the identifier of the transmitter, namely the coordinated AP) that can be used by the recipient of the frame to quickly (i.e. even before the data field of the frame is received) determine the transmitter of the PPDU. This helps the non-AP stations to correctly identify if the frame has to be processed (if it comes from the local AP).

For instance, the MU scheme as explained with reference to FIG. 2 may be implemented within those shared resource units (RU5 in the example).

The coordinated AP (AP2) thus issues a Trigger Frame 510 (in SU or MU format) in order to trigger a (second) MU UL transmission from non-AP stations of the second BSS (BSS2) over the allocated shared resource units of the (first) MU transmission triggered by the coordinator AP (AP1). The coordinated AP (triggered by AP1 through the TF 210) becomes a triggering AP for the non-AP stations of BSS2. The TF 510 defines an own Duration 312 (within the limit of TXOP defined by Duration 312 of the TF 210) and an own UL Length 332 for the MU UL transmission 530 of the non-AP stations of BSS2.

Since the coordinated AP (AP2) is the only transmitter in the 20 MHz channels forming the shared frequency band (when not subleased), the preamble 500 (preamble to TF 510) sent by the coordinated AP over the 20 MHz channel is not superposed with preamble 230 (simultaneously) sent by the STAs of BSS1 in the other 20 MHz channel(s).

Next, non-AP stations of BSS2 receive TF 510 sent by AP2, determine from TF 510 whether they are allocated RUs within the shared frequency band (RU5 in the example). Note that the RUs defined in TF 510 are encompassed within and may be subparts of the shared RUs as defined in TF 210. The non-AP stations of BSS2 may then emit their triggered UL frames 530 (with preamble 520).

A MU Downlink frame (550—together with its preamble 540) may also be conveyed inside the shared frequency band granted by AP1, in which AP2 may send several AMPDUs for multiple non-AP stations of its BSS (BSS2).

The PHY preambles 500-520-540 may have the same frequency width as the related data 510-530-550, that is to say a 20 MHz width in the example.

As shown in FIG. 5, the MU transmission within the coordinated BSS (BSS2) may be shorter in time than the one made within the coordinator BSS (BSS1)— see hatched portion. In that case, the coordinated AP (AP2) may send padding signal in order to maintain energy on the shared frequency band over the whole TXOP.

At the end of the MU transmission in the shared frequency band, the stations of the coordinated BSS (BSS2) switch back to their original primary 20 MHz channel (if temporary switch has been made).

One major requirement of this coordinated multi-AP scheme to efficiently work is the positive reception of the trigger frames by all actors, including the coordinated APs and their associated non-AP stations.

However, some non-AP stations of the coordinated BSS (e.g. stations managed by AP2 in BSS2) may be out of the transmission range of the coordinator AP (AP1) and thus may not receive the initial TF 210.

This should not be a problem for those of BSSs being allocated shared frequency bands encompassing their primary 20 MHz channel. Indeed, in that case, the coordinated AP (AP2) still emits the TF 500 in the primary channel of the coordinated BSS (BSS2) and the out-of-range non-AP stations of this BSS are able to receive it and therefore to be aware of the MU sequence to come.

But this is different when the allocated shared frequency band does not encompass the primary 20 MHz channel of the coordinated AP (AP2). This is because a temporary switch of the stations of the coordinated BSS (BSS2) is needed to receive the further communication from the coordinated AP (in particular trigger frame 510). However, the out-of-range non-AP stations of this BSS cannot be aware of such switching without receiving the initial TF 210. Consequently, they cannot participate to the coordinated TXOP, in particular they cannot receive the TF 500 that their local AP (coordinated AP, AP2) sends over the switched primary 20 MHz channel.

An enhanced multi-AP scheme overcoming this concern is proposed that is easy to implement at the coordinated APs and provide flexible multi-AP sharing.

The enhanced scheme provides, at the coordinated AP (and more generally at a coordinated device) and responsive to the receiving of the TF 210 (i.e. of the frame announcing the sharing of resources), the sending of a re-announcing frame repeating the MAC payload of the received announcing frame or repeating a large final data portion following a short starting portion (for instance a MAC header plus one or more starting fields in the MAC payload) of the announcing frame. The short starting portion is made different to make it possible for the stations to clearly distinguish between the announcing frame and the re-announcing frame. This is important so that the stations operations meet the sequence time (e.g. MU transmission starts a SIFS after the re-announcing frame).

The re-announcing ensures all the stations of the coordinated BSS (i.e. including the out-of-range stations) become aware of the resource sharing defined in the MAC payload (coming from the initial/announcing TF 210).

In addition, the mere repeating or copying of the MAC payload or of a large portion thereof (i.e. a common and fixed payload) keeps the complexity of the operations at the coordinated APs very low. This is well adapted to the very short time they have upon receiving the initial/announcing TF 210 (only a SIFS is guaranteed).

The non-AP stations of the coordinated BSS thus receive, from the coordinated AP (AP2) separate from a coordinator AP (AP1), the re-announcing frame announcing the sharing of resources of a transmission opportunity, TXOP, being granted to the coordinator device; and then, responsive to the receiving of the re-announcing frame, they switch a primary channel to an operating channel of shared resources. The operating channel thus becomes (temporarily) the primary channel for the coordinated BSS.

The coordinator AP may send the announcing frame (initial TF) comprising a re-announcing field indicating whether at least one coordinated AP concerned with the resource sharing has to re-announce the resource sharing. The coordinator AP next receives, from the coordinated AP or APs, a re-announcing frame repeating the MAC payload of the sent announcing frame or a large final data portion thereof.

While the above presentation of the multi-AP technology focuses on coordinator and coordinated APs, the present invention is directed to any kind of devices operating as coordinator and coordinated entities.

Similar to the allocation of RUs to DiL transmissions (see 222 in FIG. 2), the sharing of resources may be made to the benefit of a P2P group which can organize itself to perform DiL transmissions within the shared resources. In that case, the coordinated device is a P2P device (and not an AP), for instance an owner or manager of the P2P group.

Similarly, any device (and not only APs) can obtain a TXOP and decide to share it using the proposed mechanism. Therefore, coordinator devices may be different from APs.

In other words, in addition to the coordinated BSS, it may be considered other groups of communications, like group of stations that communicate in Direct Link (introduced above with reference to FIG. 2). Within such short range and dynamic network configuration, one station device may be elected as the Group Owner and acts as a central hub for all P2P communications. As a result, the Multi-AP (sharing) scheme may be applied to the Direct Link, wherein the device elected as group owner for a given P2P group may have an equivalent role as the coordinated AP evocated above for a given BSS.

Consequently, in the following description, it is made reference to a "coordinator device" for the entity that triggers the multi-AP-based coordinated scheme and offers shared resources to other groups or BSSs (for instance a coordinator AP or a coordinator P2P station). Correspondingly, it is made reference to a "coordinated device" for any entity that manages such other group or other BSS: for instance it may correspond to either a coordinated AP in the context of another BSS or a Group Owner station in the context of a P2P group.

Figure 6:
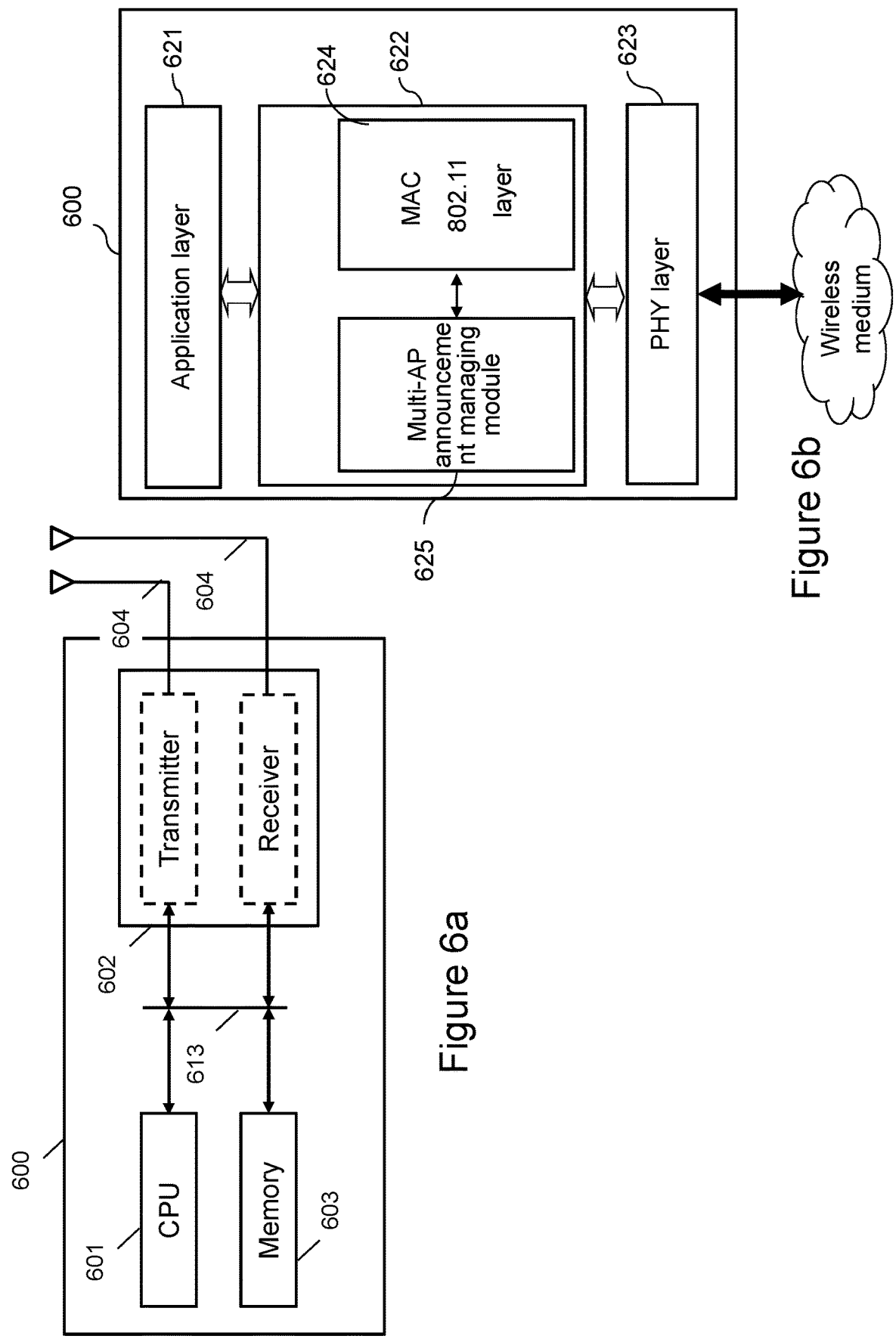
FIG. 6a shows a schematic representation a communication device in accordance with embodiments of the present invention.
FIG. 6b shows a schematic representation of a wireless communication device in accordance with embodiments of the present invention.

FIG. 6a schematically illustrates a communication device 600 configured to implement at least one embodiment of the present invention, for instance any of the (AP and non-AP) stations shown in FIG. 1. The communication device 600 is either a coordinator device, a coordinated device or a mere station managed by the coordinator or coordinated device.

The communication device 600 may preferably be a device such as a micro-computer, a workstation or a light portable device. The communication device 600 comprises a communication bus 613 to which there are preferably connected:

a central processing unit 601, such as a processor, denoted CPU;

a memory 603 for storing an executable code of methods or steps of the methods according to embodiments of the invention as well as the registers adapted to record variables and parameters necessary for implementing the methods; and at least one communication interface 602 connected to a wireless communication network, for example a communication network according to one of the IEEE 802.11 family of standards, via transmitting and receiving antennas 604.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The executable code may be stored in a memory that may either be read only, a hard disk or on a removable digital medium such as for example a disk. According to an optional variant, the executable code of the programs can be received by means of the communication network, via the interface 602, in order to be stored in the memory of the communication device 600 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 6b is a block diagram schematically illustrating the architecture of the communication device 600, adapted to carry out, at least partially, the invention. As illustrated, device 600 comprises a physical (PHY) layer block 623, a MAC layer block 622, and an application layer block 621.

The PHY layer block 623 (here an 802.11 standardized PHY layer) has the task of formatting, modulating on or demodulating from any 20 MHz channel or the common communication channel, and thus sending or receiving frames over the wireless radio medium used, such as 802.11 frames, for instance medium access trigger frames TF to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 622 preferably comprises a MAC 802.11 layer 624 implementing conventional 802.11ax MAC operations, and additional block 625 for carrying out, at least partially, the invention. The MAC layer block 622 may optionally be implemented in software, which software is loaded into RAM 603 and executed by CPU 601.

Preferably, the additional block 625, referred to as multi-AP announcement managing module which has different operations to implement parts of the invention, depending on the role played by the communication device 600. As the same device can play different roles over time, the additional block 625 is preferably designed to selectively perform the different operations.

For instance, and not exhaustively, the operations for the communication device acting as a coordinator device may include selecting coordinated devices (AP or non-AP P2P stations), generating the initial trigger frame announcing the resource sharing and comprising for instance indications of the RU allocations for the stations of the same group and for other groups, and indications of which coordinated devices have to send a re-announcing frame.

For instance, and not exhaustively, the operations for the communication device acting as a coordinated device may include receiving the announcing (trigger) frame from the coordinator device, determining whether a re-announcing frame has to be sent, preparing the re-announcing frame if required by reusing the MAC payload or a large final data portion thereof of the announcing frame, configuring the PHY layer 623 to emit the re-announcing (trigger) frame.

For instance, and not exhaustively, the operations for the communication device acting as a station in a coordinated group/BSS may include receiving the re-announcing frame from the coordinated device, retrieving the indications from the received announcing frame or re-announcing frame (if the announcing frame is not received) to securely switch its primary channel, performing conventional frame exchange for P2P (DiL) or MU transmission.

MAC 802.11 layer 624 and multi-AP announcement managing module 625 interact one with the other in order to process accurately communications over OFDMA RUs addressed to multiple stations according to embodiments of the invention.

On top of the Figure, application layer block 621 runs an application that generates and receives data packets, for example data packets such as a video stream. Application layer block 621 represents all the stack layers above MAC layer according to ISO standardization.

Embodiments of the invention in its different aspects advantageously considers emitting by one or more coordinated devices a control frame that replicates the information of an initial trigger frame (so-called "announcement frame", emitted by a coordinator device) before issuing their HE PPDUs in the obtained shared RUs, in order that all stations in the vicinities of the coordinated devices (in particular the stations out of coordinator's transmission range) can received such information before the usage of the shared RUs starts. As the initial trigger frame signals a multi-AP-based resource sharing, all the stations receiving it or a copy thereof become aware of such sharing and consequently can switch their primary channel when necessary. As the resource allocation information forming a large part of the initial TF received by the coordinated devices is replicated as it is into a new control frame (so-called "re-announcing frame"), a correct, fast and easy duplication per 20 Mhz channel can be achieved by the coordinated devices in a synchronous manner.

Figure 7:
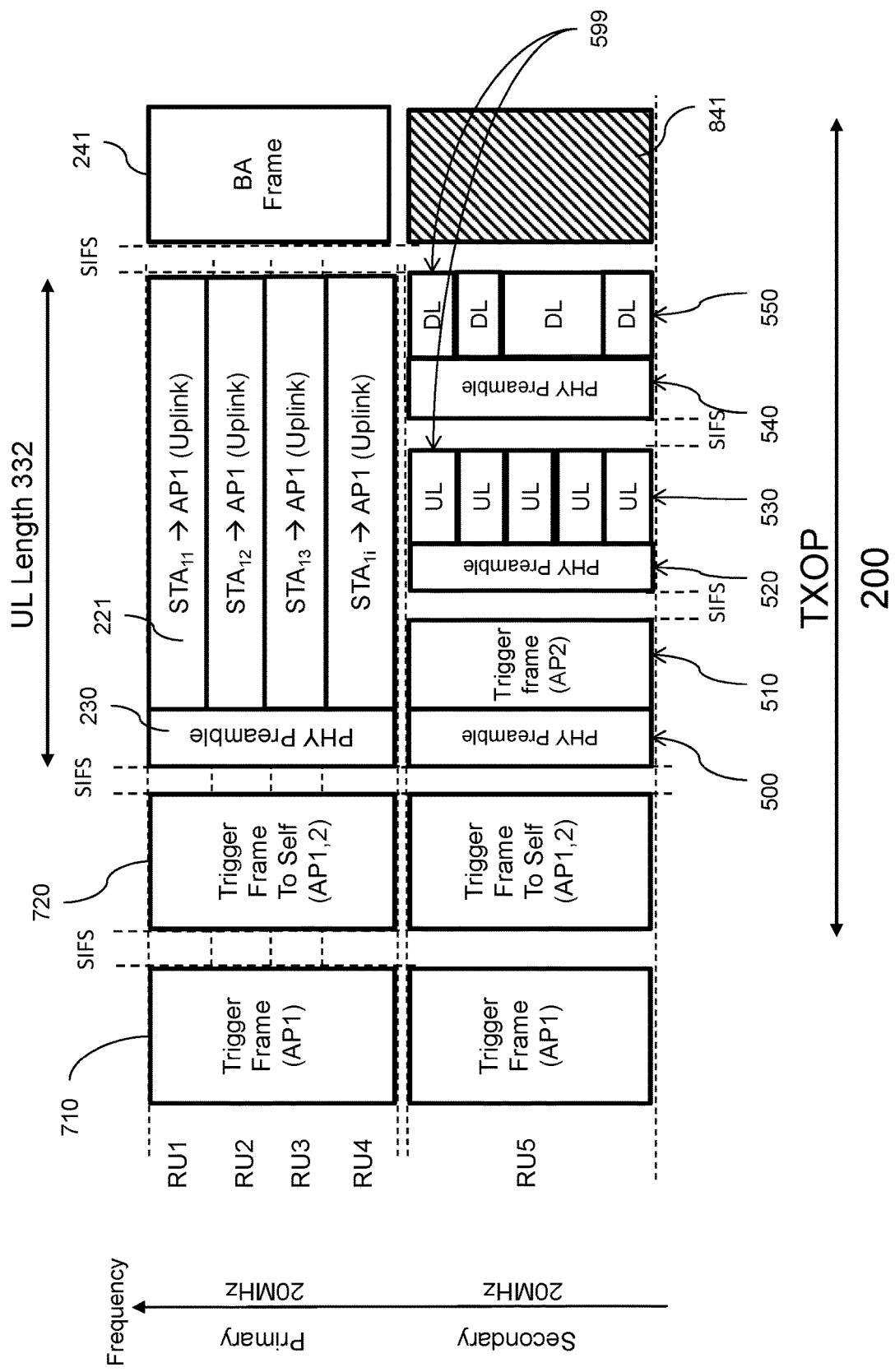
FIG. 7 illustrates another multi-AP-based transmission sequence implementing embodiments of the invention.
Figure 8:
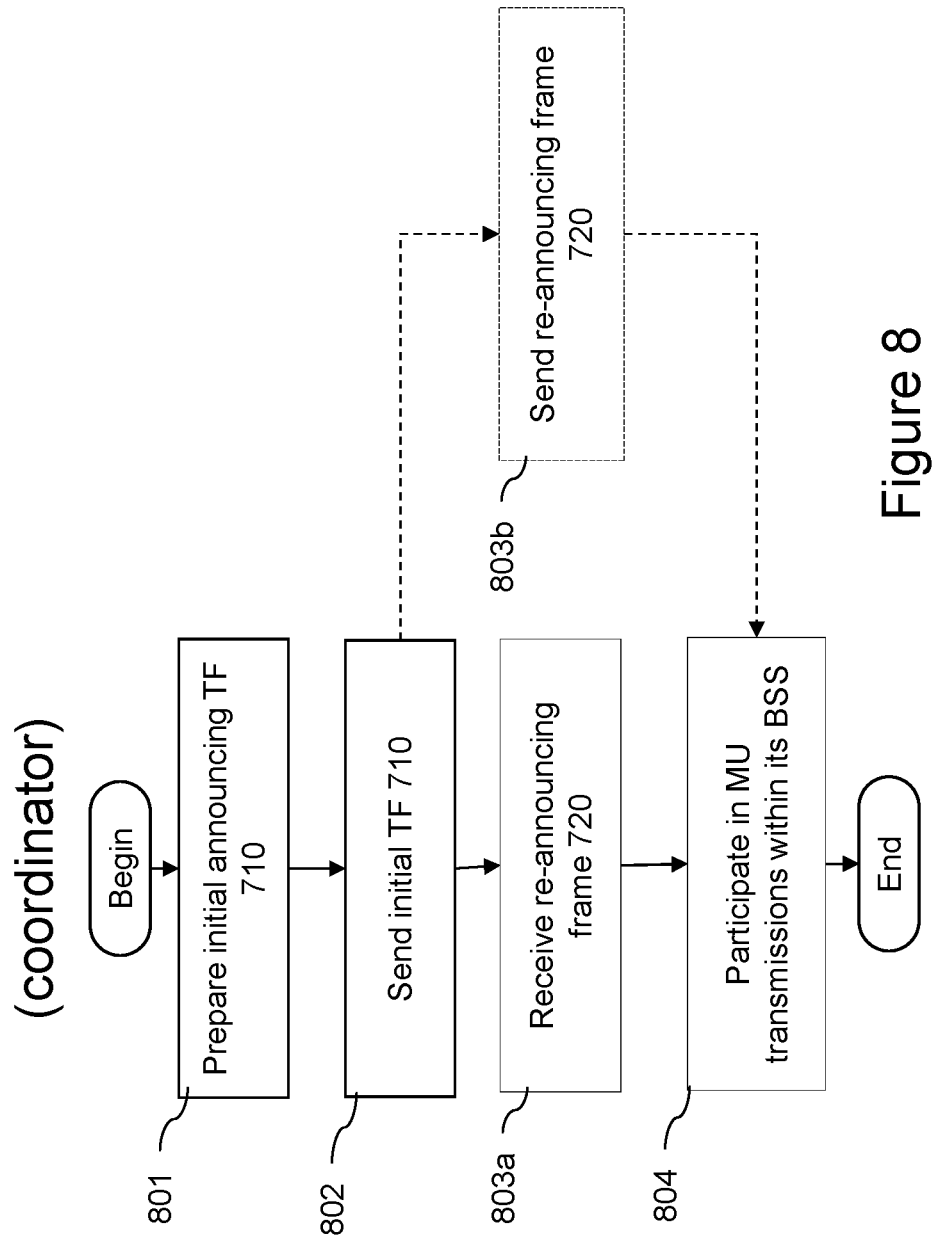
FIG. 8 illustrates, using a flowchart, general steps at a coordinator device according to embodiments of the invention.
Figure 9:
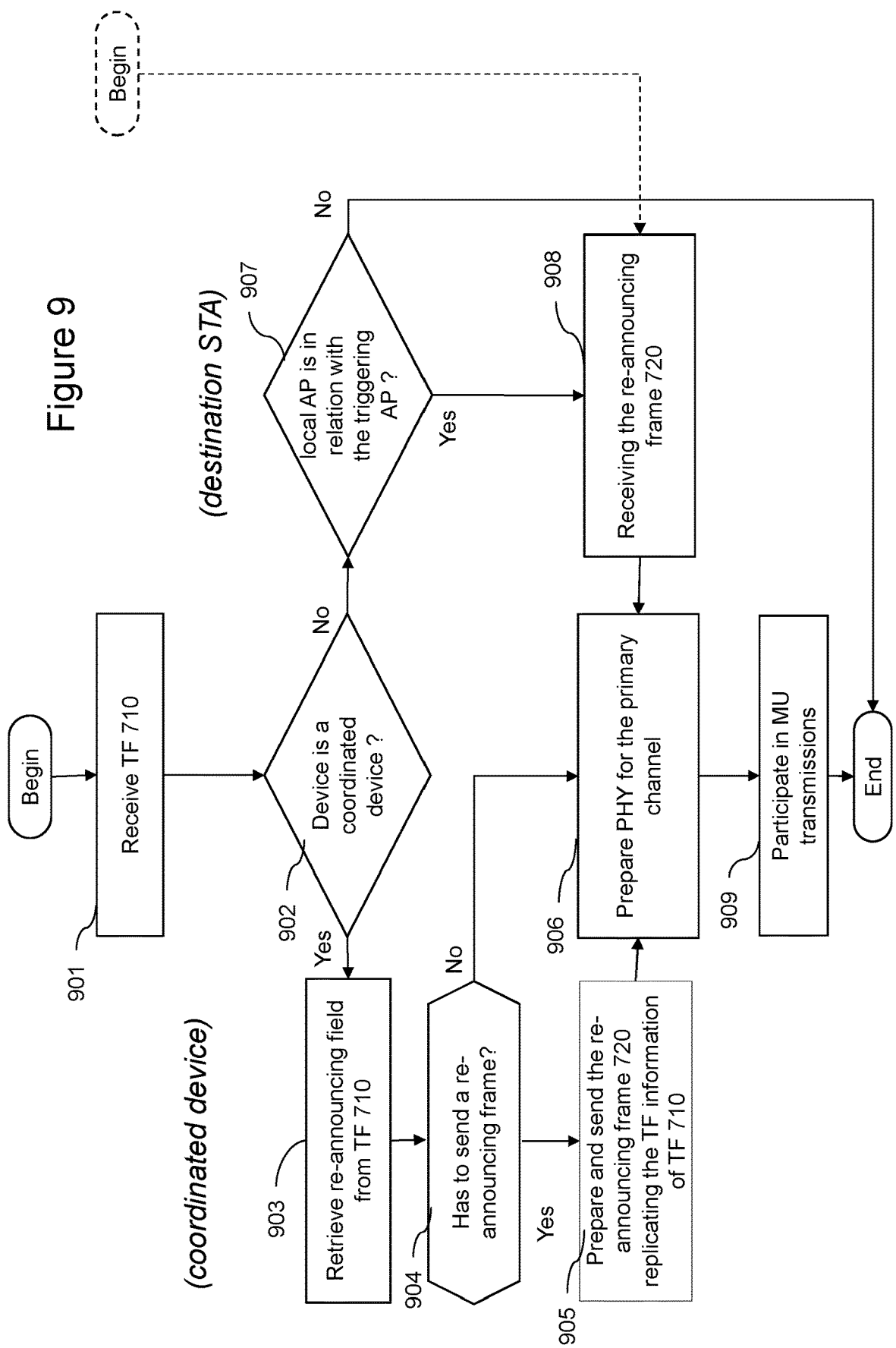
FIG. 9 illustrates, using a flowchart, general steps at a non-coordinator device according to embodiments of the invention.

The idea of the invention is illustrated in FIG. 7 which shows a similar transmission sequence to FIG. 5, with an implementation of the invention. FIG. 8 is a flowchart illustrating general steps of a communication device acting as a coordinator device, in particular during the sequence of FIG. 7, according to embodiments of the invention. FIG. 9 is another flowchart illustrating general steps of a non-coordinator communication device (i.e. acting as a coordinated device or as a mere station), in particular during the sequence of FIG. 7, according to embodiments of the invention.

As readily apparent from FIG. 7, an initial trigger frame 710 is still emitted over communication channels to announce the resource sharing based on multi-AP technology. This announcing frame is conceptually equivalent to TF 210 described above, but may optionally comprise an additional indication as further described below in order to signal when a re-announcing by the coordinated devices is required.

The TF 710 is followed by a re-announcing frame 720 sent by one or more coordinated devices (AP2), a SIFS after the announcing frame 710. It is preferably emitted in non-HT Duplicate mode by the coordinated devices over the same 20 MHz channels as for the TF 710 (or over all the corresponding 20 MHz channels which match the coordinated device's capabilities in term of bandwidth operation). Optionally, the re-announcing frame 720 may be transmitted over fewer channels, in which case it is emitted at least over the coordinated device's primary channel (so that all the stations of the same BSS receive the frame) and the channels of the shared frequency band allocated to the coordinated device.

The re-announcing frame 720 can be also named "Trigger Frame To Self" because it is intended to the BSS set (or group set) of the coordinated device emitting the frame.

According to the invention, the re-announcing frame 720 contains the same resource allocation data content as the TF 710, in particular it may binary repeat or copy the whole MAC payload (or most of it except one or more starting fields) of TF 710 where all the resource assignments (thus including the resource sharing) is defined. This allows all the stations involved in the same group/BSS as the coordinated device to receive the resource assignments, even if they were out of the transmission range of AP1 and did not receive the initial announcing frame 710.

Advantageously, when several coordinated devices are involved in the multi-AP resource sharing initiated by the coordinator device, they all simultaneously send the same re-announcing frame 710 over 20 MHz channels, preferably the same ones, in the non-HT duplicate format. All the stations of their BSSs or groups thus become aware of the resource sharing.

Where the allocated shared frequency band requires it, the stations perform a primary channel switch to the appropriate channel (indicated in the frames 710, 720 or locally known trough predefined rules).

The MU transmissions 221, 510 may then start a SIFS after the re-announcing frame 720 (including their preambles 230 and 500). Such MU transmissions have been described previously with reference to FIG. 5. For instance, the coordinated AP may further send a trigger frame over shared resources allocated to it (or its BSS) to trigger a multi-user uplink transmission over the allocated shared resources with non-AP stations of its own basic service set.

Furthermore, in embodiments seeking to reduce interference between adjacent 20 MHz channels, while the preambles 500, 520, 540 are emitted over the whole 20 MHz band, the related data 520, 540, 560 are transmitted over a narrower band. For example, an empty 26-tone RU may be defined (e.g. using AID=2046 in the corresponding User Info field 340) at one (or both) bounds of the 20 MHz channel (made of 242 tones). An empty RU is shown under reference 599 in the Figure, which is the closest RU to the primary channel of AP1.

As mentioned above, the announcing TF 710 allocates resources, e.g. one or more RUs (here RU5 defining the shared frequency band), to BSS2 by setting for instance AP2's BSSID in the corresponding "AID12" subfield 341.

In embodiments, the re-announcing process by the coordinated devices (AP2) is systematic for the coordinated devices (AP2) receiving the announcing frame 710. In that case, TF 710 can be similar to TF 210 explained above.

This may apply to Direct Link RU communications: the mere determination that a RU is a Direct Link RU is sufficient to determine that a re-announcing is required. Similarly, this may also apply to coordinated APs: the mere usage of the MAC address or a BSSID (or a value derived from it) of the coordinated AP for RU allocation is sufficient to determine that a re-announcing is required.

In specific embodiments, only the coordinated devices having to temporarily switch their primary channels (for the reasons explained above) proceed with the re-announcing of the resource sharing for their mate stations (for them to also switch). In that case, sending the re-announcing frame is further responsive to determining, from the received announcing frame 710, that the shared resources allocated to the coordinated device do not encompass a primary channel of the coordinated device (in which case temporary switch is needed).

In other embodiments, the coordinator device (AP1) may decide when the coordinated devices have to send a re-announcing frame 720, and optionally which coordinated devices have to do so.

For instance, the coordinator device may be aware that all stations of the triggered BSSs or groups are within its transmission range. In that case, all the stations will directly receive the announcing frame 710 and there is no need to send the re-announcing frame 720. The corresponding transmission time plus a SIFS are saved. Such situation typically occurs when the coordinator AP is a transmitted-BSSID AP which shares part of its time/frequency TXOP with at least one of its non-transmitted APs (which are all located within the same physical AP device).

In this context, the initial announcing frame 710 may comprise a re-announcing field indicating whether at least one coordinated device concerned with the resource sharing has to re-announce the resource sharing. The coordinated devices only have to read the re-announcing field of the received announcing frame in order to determine whether they have to re-announce the resource sharing or not.

In specific embodiments, all the coordinated devices may be requested to emit the re-announcing frame. This may be useful when the coordinator device implements a punctured TF, due to the detection of some occupied channels that cannot be used for the communication TXOP reserved by the TF.

In specific embodiments, only the coordinated devices having to temporarily switch their primary channels (for the reasons explained above) are invited to re-announce the resource sharing for their mate stations (for them to also switch). In that case, the re-announcing field indicates that coordinated devices having to switch their primary channel have to re-announce the resource sharing.

For instance, the re-announcing field may allow the coordinator AP to decide between no re-announcing (field set to 0) and a re-announcing by the switching coordinated APs (field set to 1), or to decide between a re-announcing by all the coordinated APs regardless the primary channel switching issue (field set to 0) and a re-announcing by the switching coordinated APs (field set to 1), or even to decide between the three options (the re-announcing field is thus made of at least two bits).

Of course any other conditions may be considered for selecting a subset of the coordinated devices to emit the re-announcing frame. For instance, one may select the subset of coordinated devices considered as spatially far from the coordinator device. The spatial distance may result from the measuring of a low power signal (compared to a threshold). Such example aims at enlarging the protection area by incorporating stations in the vicinity of those devices.

More generally, the coordinator device may selectively choose which coordinated devices have to send the re-announcing frame (depending for instance on strategy rules and/or history data). In that case, the re-announcing field is preferably provided at resource level (e.g. at User Info field level in a Trigger Frame).

In some embodiments, the re-announcing field is implemented in the Trigger Type subfield 331 of frame 710. Subfield 331 may be set to a value indicating a coordinating trigger frame requiring re-announcing by the coordinated devices. For instance one or more reserved values ('8', '9', and so on) can be used.

In a variant, a specific subfield (e.g. a single bit acting as the re-announcing field) can be used as a signalling element of the re-announcing requirement. Such subfield may be merely named "TF required" or "TF Duplication Required" or "TF-to-self Required" or any other appropriate name.

In one implementation, bit 39 (reference 343 in FIG. 3) of the 802.11ax User Info field 340 is used to this purpose. Alternatively, one or more bits in the Trigger Dependent User Info subfield 344 can be used. Advantageously, such bit or bits at RU level makes it possible for the coordinator AP to selectively choose which coordinated device has to re-announce the resource sharing. Also, the use of subfields at RU level is backward-compatible with the existing 802.11ax TF format.

In another implementation, a bit within the Common Info subfield 330 can be used. Such signalling is thus common to all the coordinated devices. It is preferably applied when all devices (except those of the coordinator BSS) having an allocated shared RU are considered as coordinated devices.

As an example, "CS Required" bit (reference 336 in FIG. 3) can be used, as it is meaningless at that time in the case of trigger frames for multi-AP technology. In a variant, reserved bit B63 (reference 334) can be used or any bit or multiple-bit field in the Trigger Dependent Common Info field 335 can be used. Such signalling at the Common Info field 720 level is also backward-compatible with the existing 802.11 ax TF format.

According to the invention, the re-announcing frame TF-to-self 720 has substantially the same payload content as the initial announcing frame TF 710. Due to the sequence timing (the MU transmission starts a SIFS after the re-announcing frame 720), there is a need that the re-announcing frame 720 and the initial announcing frame 710 be different, in particular for the out-of-range stations to known whether they are currently receiving the announcing frame 710 tin which case the re-announcing frame 720 is expected) or the re-announcing frame 720 (in which case the MU transmission will start a SIFS after). Therefore, a short starting portion is made different between the two frames 710, 720.

In first embodiments where the short starting portion is made of the MAC header and one (or two) or more starting fields of the MAC payload, the Trigger Type subfield 331 in the Common Info field 330 may be used to identify the TF-to-self frame as a new Trigger frame variant (using one reserved type value). The stations thus have only to read this subfield 331 to clearly distinguish TF 710 from TF 720. In these embodiments, the remainder of the MAC payload (defining the RU allocations, including the resource sharing) may be kept as it is. Optionally, the next field, UL Length subfield 332 may be adjusted.

In second embodiments, the re-announcing frame 720 comprises an empty transmitter address, TA, field in its MAC header (that is with value 0 or NULL) or does not comprise a TA field. This may advantageously be used when the whole MAC header is binary copied in the re-announcing frame 720. In that case, the creation of the re-announcing frame at the coordinated devices is very simple and quick (only a SIFS duration is guaranteed to create the frame): mere duplicate of the received announcing frame 710, wherein the transmitter address, TA, field of the MAC header is emptied or deleted. This may also be used with the above first embodiments where one or more starting fields of the MAC header are modified.

These embodiments make it possible for any station to dynamically act as a coordinator device, because there is no need to identify the coordinator device in the frames. The sharing scheme proposed by the invention is thus fully flexible.

Note that for consistency between the durations set in the re-announcing frame 720 and the initial announcing frame 710, it is preferable (but no mandatory) that the re-announcing frame 720 indicates a lower duration timer (in the Duration field 312), again reserving the same airtime as the initial announcing frame 710. For consistency, the Duration field 312 specified in the initial announcing frame TF 710 encompasses the time length of the re-announcing frame 720 transmitted in response thereto, plus one SIFS and the RU length (MU transmission time).

However, in some embodiments, the shared frequency band may be allocated to the coordinated group for a duration corresponding to the "UL Length" subfield 332 indicated in TF 710. In that case, none of the stations of the coordinated group will emit after the UL Length 332 period, releasing the frequency band to the coordinator device. This lets the final period of the TXOP unused over the shared frequency band: co-channel interferences with AP1 BSS (primary 20 MHz channel) are avoid; furthermore, BA frame 241 may be duplicated by AP1 over the released frequency band in order to occupy the medium and resetting any NAV of stations in the vicinity and operating on that 20 MHz channel.

Turning now to FIGS. 8 and 9, the operations at the various devices according to embodiments of the invention are explained.

It is assumed that all the devices (in particular the APs and the P2P group owners) have an AP Candidate Set listing the other BSSs or P2P groups wishing to be provided (through multi-AP sharing) new resources for data transmission. Based on such Set and on the resource requests coming from other APs and other P2P group owners, a coordinator device accessing the medium may decide to share resources.

With reference to FIG. 8, at step 801, the coordinator device, let say a coordinator AP, prepares the trigger frame 710 for triggering a multi-user (MU) transmission for the coordinated scheme. The TF 710 allocates some resource units to the non-AP stations of its BSS and allocates one or more resource units to other BSSs and/or P2P groups using appropriate indication (e.g. BSSID or DiL session identifier or MAC address in the corresponding AID12 subfields 341).

During the same step 801, the coordinator AP also determines whether the coordinated devices have to send the re-announcing frame 702 or not, and when applicable which coordinated devices have to do so.

As mentioned above, the coordinator AP's decision may be included in a dedicated re-announcing field, for instance the Trigger Type subfield 331 (different values correspond to different re-announcing schemes), the B39 bit 343, one or more bits in the Trigger Dependent User Info subfield 344, one or more bits within the Common Info subfield 330 such as the "CS Required" bit 336 or bit B63 334 or even one or more bits in the Trigger Dependent Common Info field 335. The coordinator AP may for instance indicate all the coordinated devices have to emit the re-announcing frame 720, or indicate none has to do it, or indicate only the primary channel switching coordinated devices have to do it, or indicate individually each coordinated device that has to do it (using for instance bit B39 343 for each shared RU).

The selection of the RUs to allocate (share) to a coordinated device may be made by the coordinator device in consideration of whether the coordinated device has to switch its primary channel. Preferably, the coordinator device seeks to reduce the number of coordinated devices (and thus of associated stations) having to switch their primary channels.

The coordinator device may be aware of the primary channels used by individual stations (e.g. it may appear that a direct link session can take place outside the BSS of the coordinator AP, such that the primary channel of direct link stations is not the same as the primary channel of the coordinator AP) and/or by coordinated BSSs (e.g. it may appear that coordinator BSS and coordinated BSS(s) have not the same primary channel). In any case, the primary channel of the coordinated devices is encompassed into the channel bandwidth operated by the coordinator AP (otherwise they will not receive the initial announcing TF 710). As an example, a BQR trigger frame (standing for Bandwidth Query Report) may be used by the coordinator AP to trigger the most appropriate channels for each of the coordinated devices/BSSs/P2P groups.

The initial announcing TF 710 so prepared is sent as described above at step 802, by the PHY of the coordinator AP, to trigger various stations (some non-AP stations of its own BSS, but also coordinated devices such as other APs of distinct BSSs and/or P2P Group Owner stations). It is sent over each 20 MHz channel forming the common communication channel detected as free.

The initial announcing TF 710 causes some coordinated devices to send the re-announcing frame 720. Consequently, at step 803*a*, the coordinator AP expects receiving (a SIFS after TF 710) such control frames 720 from the triggered coordinated device.

Optionally, the coordinator AP may also send the re-announcing frame 720 simultaneously to the coordinated device or devices. This is step 803*b*. For instance, this makes it possible to reach some devices that had difficulties or problems in receiving the initial announcing frame 710, regardless of the BSS or group to which they belong.

Next, at step 804, the coordinator AP participates to the MU communication (230, 221, 241) over the resource units kept for its BSS. If the RUs are uplink RUs, the coordinator AP receives data frames from non-AP STAs of its BSS.

Note that other transmissions are performed in parallel over the shared frequency bands that do not involve the coordinator AP. For each shared DiL RU, the destination non-AP STA (of direct link communication) receives data frames from the P2P group Owner over this RU. For each shared RU allocated to a distinct BSS, a MU transmission within the distinct BSS takes place (between non-AP STAs of this distinct BSS and the coordinated AP of the same BSS).

With reference to FIG. 9, any non-coordinator device in the transmission range of the coordinator AP and whose primary channel conveys one of the duplicates of the initial announcing TF 710, receives the initial announcing TF 710 at step 901. The non-coordinator device can be a non-AP STA of any BSS, an AP of a BSS, or a STA within a P2P group.

Note that conventional trigger frames are processed in a conventional manner (802.11ax for instance) not shown in the flowchart.

The device may identify the received frame is a resource-sharing announcing frame 710 using information therein.

For instance, the TF 710 may comprise a dedicated Trigger Type subfield 331 identifying the announcing frame, and thereby inviting each receiving device to analyse each User Info element therein in to determine whether it is concerned with the coming MU transmission.

Alternatively, the device may analyse each User Info element of TF 710 to determine whether a resource are shared with other BSSs or P2P groups (e.g. if an AID12 subfield includes a BSSID or a P2P session identifier or a MAC address).

Other means can be envisaged for allowing analysis of the TF received. As example, a device could have previously determined that its associated AP or group owner has informed other APs (coordinator device candidates) of its AP Coordination capability through the list of capabilities advertised in management (e.g. beacon or probe response) frames the AP or group owner transmits.

At step 902, the non-coordinator device determines whether it acts as a coordinated device. Basically, it is the case when it is the AP of a BSS or the group owner of a P2P group to which a shared resource is allocated. In practice, the presence of its BSSID or MAC address in the AID12 subfield of one User Info element (or any list of coordinated devices within the frame) is sufficient for the device to determine it is a coordinated device.

In the affirmative of test 902, the coordinated device retrieves the re-announcing field (if any) from the received TF 710 at step 903. This is to determine (test 904) whether the coordinated device has to emit a re-announcing frame 720.

In the affirmative of test 904, the coordinated device creates the re-announcing frame 720 as described above, in particular by binary copying the MAC payload or a large data portion thereof, in addition to preparing the MAC header with for instance a TA field empty. The re-announcing frame 720 is then sent a SIFS after the initial TF 710. The sending is performed simultaneously by all the triggered coordinated devices, in a duplication mode. This is step 905.

The next step is step 906 during which the device configures itself on the correct primary channel.

As indicated above, if its original primary channel is encompassed by the shared resources allocated to it and its BSS or P2P group, the device does not have to modify its primary channel. Only the Physical, PHY, layer is configured in state to MU operate over the allocated shared resource unit or units.

On the other side, if its original primary channel is not encompassed by the shared resources allocated to it and its BSS or P2P group, the device has to temporarily switch its primary channel at the PHY layer. If the allocated shared resource is greater than a single 20 MHz channel, then only one 20 MHz channel becomes the primary channel and the other channel(s) is(are) secondary channel(s).

In the negative of test 904, the process directly goes to step 906 to prepare the PHY layer.

Back to test 902, if the result is negative, the device is not a coordinated device.

At test 907, the device determines whether it is concerned by the TXOP 200.

For the non-AP stations of the coordinator AP, it means they are allocated an RU (an AID12 subfield of a User Info field comprises their own AID).

For other devices not belonging to the coordinator AP's BSS, they have to determine whether a shared resource is allocated to their BSS or P2P group. This can be made by analyzing the User Info fields 340 of the RUs, in order to detect an identifier corresponding to their BSS or P2P group (e.g. a MAC address, DiL session identifier, BSSID).

In case the device is not concerned by the TF 710, the process ends. Otherwise, the device waits for reception (step 908) of the re-announcing TF 720 (simultaneously sent by triggered coordinated devices, including possibly its local AP).

Next to step 908, the device prepares its PHY to the correct primary channel (step 906 described above), in particular it switches its primary channel if needed.

Note that the devices out of the coordinator AP's transmission range do not receive the TF 710 (step 901). However, thanks to the present invention, those concerned with the TXOP 200 finally receive the re-announcing frame 720 (at least from their local AP or group owner). For these out-of-range devices, the process starts directly at step 908 (dotted arrow on the right side of the Figure). Thanks to the specific signaling in TF 720, these devices are able to determine the received frame is a re-announcing frame and not the initial TF 710.

Once the PHY of the devices are ready (before a SIFS following the re-announcing TF 720), they participate to the MU transmissions (which start a SIFS after TF 720) in their respective allocated RUs (step 909). At the end of the TXOP 200, the devices that have switched their primary channel, switch back to their original primary channel.

The present invention thus makes it possible for the out-of-range stations to finally be aware of the resource sharing, and consequently to temporarily switch their primary channel to actually participate to the MU transmissions. The present invention has low impact on the network (only the transmission time of the re-announcing TF 720 plus a SIFS). This is because, thanks to the binary copying of substantially all the MAC payload, the various coordinated devices can quickly generate the same re-announcing frame and thus send it simultaneously (and not successively).

Although the description above is based on frequency division, the proposed mechanism based on successive announcing frame TF 710 and re-announcing frame TF 720 can apply with a timing division sharing (that is to say the various coordinated devices obtain each a timeslot for their BSS successively, and communications operates on a single-user mode).

As shown in FIG. 3, the trigger frame format also includes a MCS subfield 345 in the User Info field 340 corresponding to each RU. The MCS subfield indicates the modulation and coding schemes to be used. The coordinator device may specify a different MCS in the User Info fields 340 of the shared resources allocated to the coordinated devices (when preparing the frame at step 801). Based on this indication, the coordinated devices may send the re-announcing frame 720 with a different MCS.

For instance a greater MCS may be indicated so that the overhead impact due to the re-announcing frame 720 is reduced. The MCS value is preferably identical for all the coordinated devices (so that the re-announcing frames sent by them correctly superpose one with each other).

Figure 10:
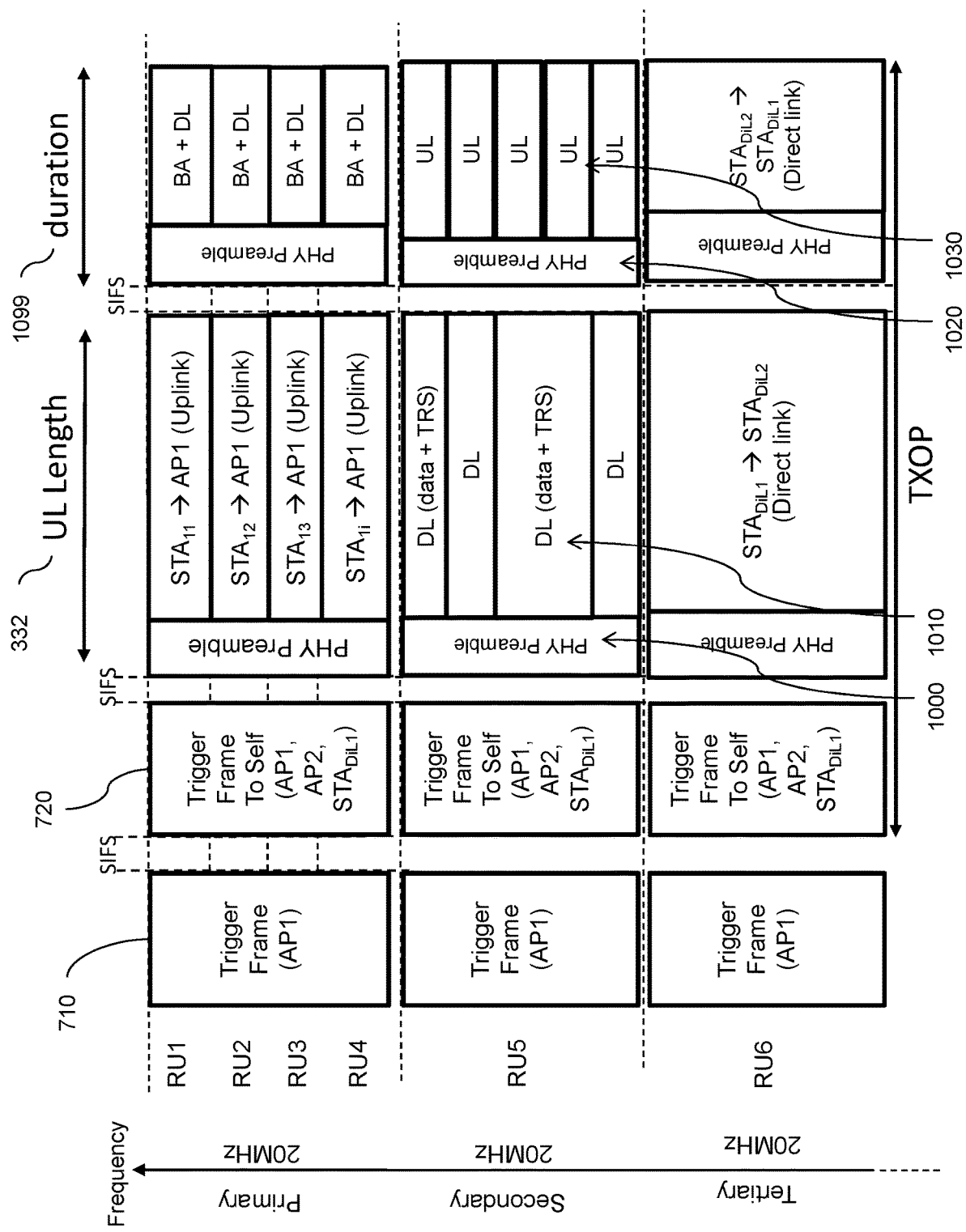
FIG. 10 illustrates an alternative multi-AP-based transmission sequence implementing embodiments of the invention.

FIG. 10 illustrates another transmission sequence according to embodiments of the invention.

In this scenario, AP1 reserves a communication channel over three 20 MHz channels. AP1 acts as a coordinator AP, meaning that TF 710 is an announcing frame sharing resources (here RU5 and RU6) with other BSSs or P2P groups. In the example, RU5 is allocated to BSS2 managed by AP2 while RU6 is allocated to a P2P group managed by $STA_{DiL1}$.

AP2 and $STA_{DiL1}$ receive the announcing frame 710 and as coordinated devices they subsequently (after a SIFS) emit the same re-announcing frame 720 (simultaneously) by repeating substantially all the MAC payload. In the Figure, the coordinator device, AP1, also sends the re-announcing frame 720 simultaneously.

Upon receiving the re-announcing frame 720, all the non-AP stations of BSS2 and of the P2P group (including those out of AP1's transmission range) are now aware of the resource sharing and can temporarily switch their primary channel, if needed. They are ready to perform data transmission during the TXOP.

In this scenario, the transmission sequence within BSS2 is modified compared to FIG. 7: to avoid having preamble 500 and related data 510, coordinated AP2 starts communicating in the shared RU with a DL transmission (DL MU PPDU— preamble 1000 and data RU 1010) that lasts during the entire UL Length 332 defined in TF 710. In other words, the coordinated device starts a multi-user downlink transmission over allocated shared resources with non-AP stations of its own basic service set.

An UL communication (UL PPDU— preamble 1020 and UL data 1030) can take place a SIFS after the DL communication. This aims at aligning the communications between the BSSs (here BSS1 and BSS2), in particular aligning the preambles. It results that the co-channel interferences are reduced.

In order that the UL transmission correctly occurs without a trigger frame being emitted, the DL MU PPDU (1000, 1010) is used to trigger the Uplink RUs. In other words, the multi-user downlink transmission includes an indication of a subsequent multi-user uplink transmission opportunity over the allocated shared resources.

For instance, some of the DL data frames contain a TRS Control subfield (according to 802.11 ax, TRS Control subfield in the MAC header is used to initiate OFDMA transmissions in the uplink direction and identifies non-AP STAs participating in the UL MU transmissions and assigns RUs to these STAs). The resulting UL RUs 1030 provide room for triggered (via TRS) non-AP stations of BSS2 to emit UL data and/or acknowledgments with regards to the received DL data 1010.

Usually, the TRS subfield within the MAC header of a data frame is used to trigger a response (UL transmission) from the same non-AP station that receives the DL data frame. This means that the same non-AP STAs are addressed in DL and in UL.

In order to bypass that limitation, the coordinated AP2 may consider using at least one DL RU in a broadcast mode to send several MAC data frames, each with a dedicated TRS subfield, to several non-AP stations respectively. The DL broadcast RU is thus allowed to trigger several and distinct UL RUs during the next UL transmission (having a signalled duration 1099).

Note that the DL plus UL communication sequence fits inside the original Duration 312 specified in the initial announcing frame TF 710: SIFS+duration of TF 720+SIFS+ UL Length 332+SIFS+duration 1099<Duration 312 of TF 710.

In parallel, shared RU6 is used for DiL transmission. Preferably, DiL transmissions are aligned on the MU transmissions in BSS1 and BSS2. To achieve that, the UL Length field 332 of TF 710 is used to define the duration of the first DiL transmission ($STA_{DiL1}$ to $STA_{DiL2}$) and then, after a SIFS, a second DiL transmission ($STA_{DiL2}$ to $STA_{DiL1}$) can take place that may last until the end of the TXOP (defined by Duration 312 of TF 710).

Although the present invention has been described hereinabove with reference to specific embodiments, the present invention is not limited to the specific embodiments, and modifications will be apparent to a skilled person in the art which lie within the scope of the present invention.

In particular, the different HE frame formats described from different embodiments may be replaced by EHT frame formats, where appropriate.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network comprising, at a wireless device operating on a primary channel to communicate with one or more other wireless devices:

receiving, from a coordinator device being granted a transmission opportunity (TXOP), a frame announcing the sharing of resources of the granted TXOP with the wireless device, the announcing frame being made of a Medium Access Control (MAC) header and a MAC payload that comprises resource allocation data content defining an allocation of the resources to the wireless device; and responsive to the receiving of the announcing frame, controlling a switch of the operating primary channel to another primary channel corresponding to the shared resources and sending a re-announcing frame repeating the resource allocation data content of the received announcing frame to drive one or more of the other wireless devices to switch their operating primary channel to the other primary channel.

2. The method of claim 1, wherein the re-announcing frame has a MAC header and one or more starting fields in a MAC payload that are different from the announcing frame.

3. The method of claim 1, wherein sending the re-announcing frame is further responsive to determining, from the received announcing frame, that the shared resources allocated to the wireless device do not correspond to a primary channel of the wireless device.

4. The method of claim 1, wherein sending the re-announcing frame is further responsive to determining that a re-announcing field of the received announcing frame indicates the wireless device has to re-announce the resource sharing.

5. The method of claim 4, wherein the re-announcing field indicates that wireless devices having to switch their primary channel have to re-announce the resource sharing.

6. The method of claim 1, wherein the wireless device is a managing device managing a group of wireless devices.

7. The method of claim 1, wherein the re-announcing frame comprises an empty transmitter address (TA) field or no TA field in its MAC header.

8. The method of claim 1, wherein the wireless device is an Access Point (AP) that further sends a trigger frame over shared resources allocated to the AP to trigger a multi-user uplink transmission over the allocated shared resources with non-AP stations of its own basic service set.

9. The method of claim 1, wherein the wireless device is an Access Point (AP) that further starts a multi-user downlink transmission over allocated shared resources with non-AP stations of its own basic service set.

10. The method of claim 9, wherein the multi-user downlink transmission includes an indication of a subsequent multi-user uplink transmission opportunity over the allocated shared resources.

11. The method of claim 1, wherein the wireless device further sends a frame announcing the sharing of part of the shared resources allocated to the wireless device.

12. A communication method in a wireless network comprising, at a coordinator device:

sending a frame to obtain a granted transmission opportunity (TXOP), the frame further announcing the sharing of resources of the granted TXOP with one or more coordinated devices and comprising a re-announcing field indicating whether the one or more coordinated devices concerned with the resource sharing have to re-announce the resource sharing if they have to switch a primary channel on which they operate to communicate with one or more other wireless devices, the announcing frame including a Medium Access Control (MAC) header and a MAC payload that comprises resource allocation data content defining an allocation of the resources to the one or more coordinated devices; and receiving, from the coordinated device or devices, a re-announcing frame repeating the resource allocation data content of the sent announcing frame.

13. The method of claim 12, wherein the re-announcing field is provided at shared resource level.

14. The method of claim 12, wherein the coordinator device further sends a re-announcing frame repeating the resource allocation data content simultaneously to the coordinated device or devices.

15. A wireless communication device comprising at least one microprocessor configured for carrying out the steps of the method of claim 1.

16. A non-transitory computer-readable medium storing a program which, when executed by a microprocessor or computer system in a wireless device, causes the wireless device to perform the method of claim 1.

* * * * *